US008983778B2

(12) United States Patent
McCarthy

(10) Patent No.: US 8,983,778 B2
(45) Date of Patent: Mar. 17, 2015

(54) GENERATION OF INTERSECTION INFORMATION BY A MAPPING SERVICE

(71) Applicant: Apple Inc., Cupertino, CA (US)

(72) Inventor: Paul S. McCarthy, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/631,995

(22) Filed: Sep. 30, 2012

(65) Prior Publication Data

US 2013/0325339 A1 Dec. 5, 2013

Related U.S. Application Data

(60) Provisional application No. 61/655,997, filed on Jun. 5, 2012, provisional application No. 61/656,032, filed on Jun. 6, 2012, provisional application No. 61/656,043, filed on Jun. 6, 2012, provisional application No. 61/657,864, filed on Jun. 10, 2012, provisional application No. 61/657,880, filed on Jun. 10, 2012, provisional application No. 61/699,855, filed on Sep. 11, 2012, provisional application No. 61/699,851, filed on Sep. 11, 2012, provisional application No. 61/699,862, filed on Sep. 11, 2012, provisional application No. 61/699,857, filed on Sep. 11, 2012, provisional application No. 61/699,853, filed on Sep. 11, 2012.

(51) Int. Cl.
G01C 21/32 (2006.01)
G06T 15/00 (2011.01)
G06K 9/46 (2006.01)
G01C 21/36 (2006.01)
G06F 17/30 (2006.01)
G06T 19/20 (2011.01)
G01C 21/28 (2006.01)

(52) U.S. Cl.
CPC ............... *G06T 15/005* (2013.01); *G06K 9/46* (2013.01); *G01C 21/3635* (2013.01); *G06F 17/30342* (2013.01); *G01C 21/3638* (2013.01); *G06F 17/30241* (2013.01); *G06T 19/20* (2013.01); *G01C 21/28* (2013.01); *G06T 2219/2016* (2013.01); *G06T 2219/2024* (2013.01)
USPC ............ 701/532; 701/400; 701/426; 701/517

(58) Field of Classification Search
None
See application file for complete search history.

(56) References Cited

U.S. PATENT DOCUMENTS 5,629,854 A 5/1997 Schulte
5,787,233 A * 7/1998 Akimoto .................... 706/45

(Continued)

FOREIGN PATENT DOCUMENTS

EP 0822529 2/1998
EP 1788541 5/2007

(Continued)

OTHER PUBLICATIONS

Author Unknown, "Tom Tom GO Live 1005 on the road Re-routing," PocketGPS, Mar. 8, 2012, 1 page, available at http://www.youtube.com/watch?v=sJf_NOcqoNA.

(Continued)

*Primary Examiner* — Thomas Tarcza
*Assistant Examiner* — Richard Goldman
(74) *Attorney, Agent, or Firm* — Adeli LLP

(57) ABSTRACT

Some embodiments provide a method for generating intersection data for paths in a map region. The method receives a set of junctions at which paths intersect in the map region. For a particular junction of at least two paths, the method automatically determines whether any of the other junctions in the map region satisfy criteria to be part of a single intersection with the particular junction. When at least one of the other junctions satisfies the criteria, the method automatically combines the other junctions that satisfy the criteria with the particular junction into a single intersection for use in performing mapping operations.

22 Claims, 23 Drawing Sheets

(56) References Cited

U.S. PATENT DOCUMENTS

| | | | |
|---|---|---|---|
| 5,878,368 A | 3/1999 | DeGraaf | |
| 6,163,269 A | 12/2000 | Millington et al. | |
| 6,173,232 B1* | 1/2001 | Nanba et al. | 701/446 |
| 6,178,380 B1 | 1/2001 | Millington | |
| 6,202,026 B1 | 3/2001 | Nimura et al. | |
| 6,295,503 B1 | 9/2001 | Inoue et al. | |
| 6,311,125 B1* | 10/2001 | Okano et al. | 701/431 |
| 6,321,161 B1 | 11/2001 | Herbst et al. | |
| 6,381,534 B2 | 4/2002 | Takayama et al. | |
| 6,480,783 B1 | 11/2002 | Myr | |
| 6,487,305 B2* | 11/2002 | Kambe et al. | 382/113 |
| 6,539,300 B2 | 3/2003 | Myr | |
| 6,577,946 B2 | 6/2003 | Myr | |
| 6,587,784 B1 | 7/2003 | Okude et al. | |
| 6,597,354 B2* | 7/2003 | Sakamoto et al. | 345/419 |
| 6,615,130 B2 | 9/2003 | Myr | |
| 6,693,564 B2* | 2/2004 | Niitsuma | 340/995.2 |
| 7,054,742 B2 | 5/2006 | Khavakh et al. | |
| 7,158,876 B2 | 1/2007 | Crook | |
| 7,194,356 B2 | 3/2007 | Sano | |
| 7,433,780 B2 | 10/2008 | Machino | |
| 7,437,279 B2 | 10/2008 | Agrawala et al. | |
| 7,440,875 B2* | 10/2008 | Cuthbert et al. | 703/2 |
| 7,460,953 B2 | 12/2008 | Herbst et al. | |
| 7,480,565 B2* | 1/2009 | Ikeuchi et al. | 701/410 |
| 7,698,063 B2* | 4/2010 | Kim | 701/437 |
| 7,702,456 B2 | 4/2010 | Singh | |
| 7,734,415 B2* | 6/2010 | Oumi et al. | 701/417 |
| 7,761,227 B2 | 7/2010 | Kropp | |
| 8,041,503 B2* | 10/2011 | Choi et al. | 701/117 |
| 8,103,440 B2* | 1/2012 | Sengoku et al. | 701/400 |
| 8,214,142 B2 | 7/2012 | Cerecke et al. | |
| 8,301,378 B2 | 10/2012 | Nishibashi et al. | |
| 8,306,730 B2 | 11/2012 | Nishibashi et al. | |
| 8,339,990 B1 | 12/2012 | Tzamaloukas | 370/254 |
| 8,364,398 B2* | 1/2013 | Rossio et al. | 701/439 |
| 8,370,060 B2* | 2/2013 | Rossio et al. | 701/439 |
| 8,463,289 B2* | 6/2013 | Shklarski et al. | 455/456.1 |
| 8,589,075 B1 | 11/2013 | Jones | |
| 8,600,654 B2* | 12/2013 | Kishikawa et al. | 340/995.1 |
| 8,612,151 B2* | 12/2013 | Winkler et al. | 701/533 |
| 8,676,466 B2* | 3/2014 | Mudalige | 701/93 |
| 8,694,242 B2* | 4/2014 | Nagase | 701/414 |
| 2001/0028350 A1 | 10/2001 | Matsuoka et al. | |
| 2002/0059296 A1 | 5/2002 | Hayashi et al. | |
| 2002/0103599 A1 | 8/2002 | Sugiyama et al. | |
| 2003/0040864 A1* | 2/2003 | Stein | 701/200 |
| 2003/0231190 A1 | 12/2003 | Jawerth et al. | |
| 2004/0001114 A1 | 1/2004 | Fuchs et al. | |
| 2004/0212627 A1 | 10/2004 | Sumizawa et al. | |
| 2004/0236507 A1 | 11/2004 | Maruyama et al. | |
| 2005/0049786 A1 | 3/2005 | Odachi et al. | |
| 2005/0107993 A1* | 5/2005 | Cuthbert et al. | 703/2 |
| 2005/0131631 A1* | 6/2005 | Nakano et al. | 701/200 |
| 2005/0149261 A9* | 7/2005 | Lee et al. | 701/210 |
| 2006/0025923 A1 | 2/2006 | Dotan et al. | |
| 2006/0217879 A1* | 9/2006 | Ikeuchi et al. | 701/208 |
| 2007/0088502 A1* | 4/2007 | Oumi et al. | 701/211 |
| 2007/0276596 A1 | 11/2007 | Solomon et al. | |
| 2007/0276597 A1* | 11/2007 | Kato et al. | 701/211 |
| 2008/0068223 A1* | 3/2008 | Behr et al. | 340/995.19 |
| 2008/0077324 A1* | 3/2008 | Hatano et al. | 701/212 |
| 2008/0091344 A1 | 4/2008 | Mikuriya et al. | |
| 2008/0154489 A1* | 6/2008 | Kaneda et al. | 701/201 |
| 2008/0195307 A1* | 8/2008 | Raynaud et al. | 701/202 |
| 2008/0238941 A1 | 10/2008 | Kinnan et al. | |
| 2009/0037094 A1 | 2/2009 | Schmidt | |
| 2009/0105944 A1 | 4/2009 | Urano et al. | |
| 2009/0216442 A1* | 8/2009 | Luert | 701/211 |
| 2009/0262117 A1 | 10/2009 | Soulchin et al. | |
| 2009/0312942 A1* | 12/2009 | Froeberg | 701/200 |
| 2010/0057358 A1 | 3/2010 | Winer et al. | |
| 2010/0125386 A1* | 5/2010 | Ibrahim | 701/36 |
| 2010/0324817 A1 | 12/2010 | Hansen et al. | |
| 2010/0328100 A1 | 12/2010 | Fujiwara et al. | |
| 2011/0054772 A1 | 3/2011 | Rossio et al. | |
| 2011/0118971 A1* | 5/2011 | Petzold et al. | 701/200 |
| 2011/0264708 A1* | 10/2011 | Smartt | 707/803 |
| 2011/0285717 A1 | 11/2011 | Schmidt et al. | |
| 2012/0249343 A1* | 10/2012 | Thomas | 340/905 |
| 2012/0259539 A1 | 10/2012 | Sumizawa | |
| 2012/0322458 A1* | 12/2012 | Shklarski et al. | 455/456.1 |
| 2013/0290400 A1* | 10/2013 | Zhou et al. | 709/201 |
| 2013/0325339 A1* | 12/2013 | McCarthy | 701/533 |
| 2013/0325342 A1* | 12/2013 | Pylappan et al. | 701/533 |
| 2013/0328861 A1* | 12/2013 | Arikan et al. | 345/419 |
| 2013/0328915 A1* | 12/2013 | Arikan et al. | 345/619 |
| 2013/0328916 A1* | 12/2013 | Arikan et al. | 345/619 |
| 2013/0328924 A1* | 12/2013 | Arikan et al. | 345/629 |
| 2013/0328937 A1* | 12/2013 | Pirwani et al. | 345/660 |

FOREIGN PATENT DOCUMENTS

| | | |
|---|---|---|
| WO | WO 86/02764 | 5/1986 |
| WO | WO 2005/103624 | 11/2005 |
| WO | WO 2011/146141 | 11/2011 |

OTHER PUBLICATIONS

Dal Poz, A.P., et al, "Automated Extraction of Road Network from Medium- and High-Resolution Images," Pattern Recognition and Image Analysis, Apr.-Jun. 2006, pp. 239-248, vol. 16, No. 2, Pleiades Publishing, Inc.

* cited by examiner

GENERATION OF INTERSECTION INFORMATION BY A MAPPING SERVICE

CLAIM OF BENEFIT TO PRIOR APPLICATIONS

This application claims the benefit of U.S. Provisional Application 61/655,997, entitled "Route Navigating Method and Apparatus", filed Jun. 5, 2012; U.S. Provisional Application 61/656,032, entitled "Camera Animation During Navigation", filed Jun. 6, 2012; U.S. Provisional Application 61/656,043, entitled "Camera Animation During Navigation", filed Jun. 6, 2012; U.S. Provisional Application 61/657,864, entitled "Route Navigating Method and Apparatus", filed Jun. 10, 2012; U.S. Provisional Application 61/657,880, entitled "Generating and Presenting Immersive and Non-Immersive 3D Map Presentations for Browsing and Navigation", filed Jun. 10, 2012; U.S. Provisional Application 61/699,855, entitled "Rendering Maps", filed Sep. 11, 2012; U.S. Provisional Application 61/699,851, entitled "Voice Instructions During Navigation", filed Sep. 11, 2012; U.S. Provisional Application 61/699,862, entitled "Generating Map Data for Rendering", filed Sep. 11, 2012; U.S. Provisional Application 61/699,857, entitled "Providing Navigation Instructions While Operating Navigation Application in Background", filed Sep. 11, 2012; and U.S. Provisional Application 61/699,853, entitled "Navigation Application", filed Sep. 11, 2012. U.S. Applications 61/655,997, 61/656,032, 61/656,043, 61/657,864, 61/657,880, 61/699,855, 61/699,851, and 61/699,862 are incorporated herein by reference.

BACKGROUND

Many map-based applications are available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes the relative location of streets, highways, points of interest, etc. in the map.

The maps used in such applications are usually two-dimensional (2D) maps or three-dimensional (3D) maps. However, a large number of the applications use 2D maps due in part to the processing-intensive demands of viewing 3D maps. For the same reason, the applications that use 3D maps are often slow, inefficient, plain, and/or simple, to the point that renders the application useless.

BRIEF SUMMARY

Some embodiments of the invention provide novel methods for generating and presenting immersive and non-immersive 3D map presentations for browsing and navigation. In some embodiments, the immersive and non-immersive 3D map presentations can be alternatively and/or sequentially displayed on a device (e.g., a mobile device) that has a touch-sensitive screen and a multi-touch interface that allow a user to interact with the presentations through touch and gestural inputs on the screen. In other embodiments, the presentations are provided on a device that does not have a touch-sensitive screen.

In some embodiments, these 3D presentations are provided by an integrated mapping application that provides several useful modalities, such as location browsing, map searching, route identifying, and route navigation operations. However, in other embodiments, the mapping application does not employ all of these modalities. For instance, in some embodiments, the mapping application does not provide route navigation.

In order to display immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

In order to specify intersections, some embodiments begin with the road graph data, which includes junctions and 1-D road segments. From this data, the set of servers identifies junctions that stand on their own as intersections as well as sets of junctions that should be combined into a single intersection. The set of servers then stores these intersections for use in generating route data in response to user requests. Furthermore, some embodiments modify the intersection data to conform to specifics of a route before providing the intersection data to a requesting user device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

Figure 1:
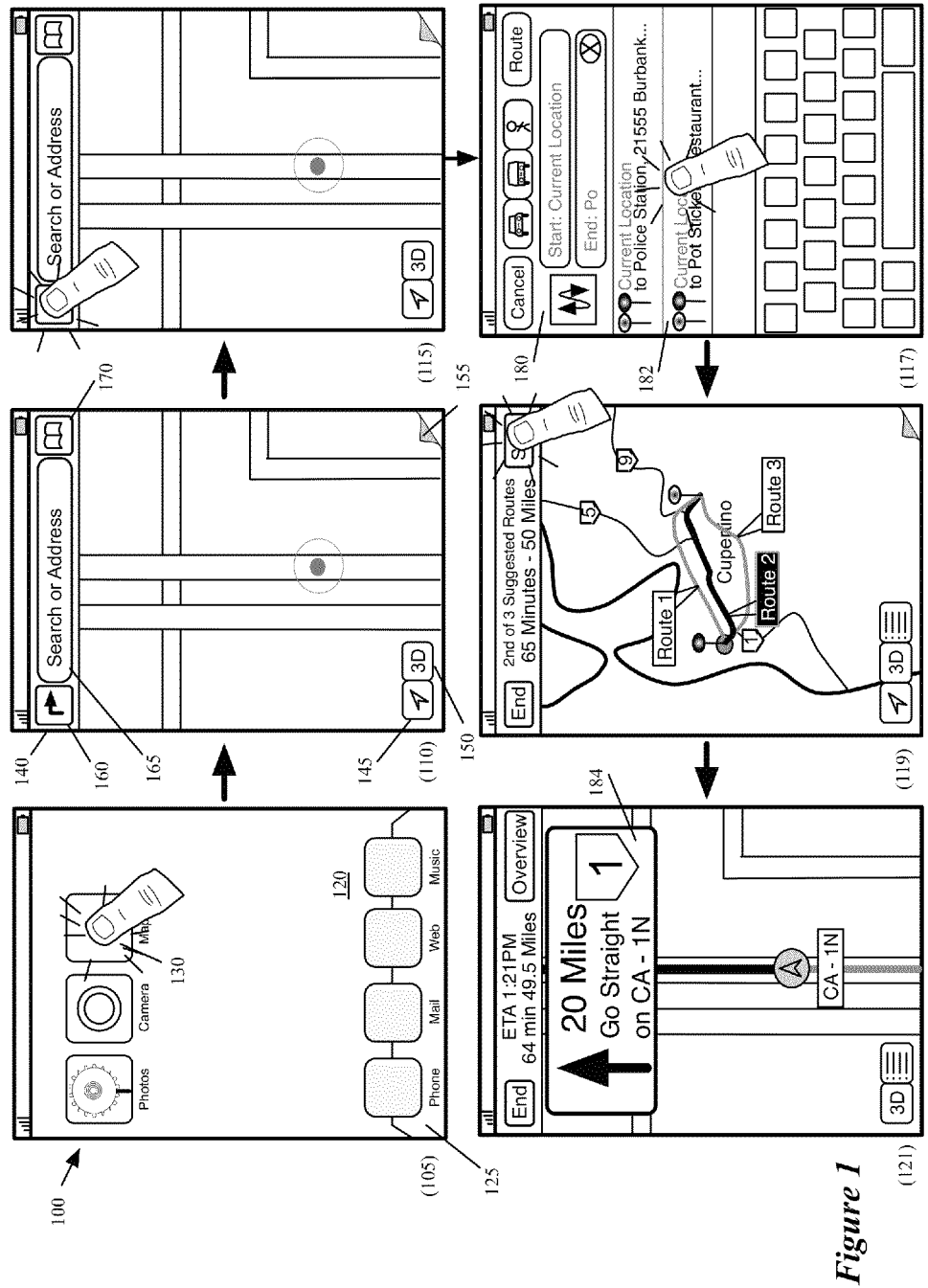
FIG. 1 illustrates an example of a device that executes an integrated mapping application of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for generating and presenting immersive and non-immersive 3D map presentations for browsing and navigation. In some embodiments, the immersive and non-immersive 3D map presentations can be alternatively and/or sequentially displayed on a device (e.g., a mobile device) that has a touch-sensitive screen and a multi-touch interface that allow a user to interact with the presentations through touch and gestural inputs on the screen. In other embodiments, the presentations are provided on a device that does not have a touch-sensitive screen.

In some embodiments, these 3D presentations are provided by an integrated mapping application that provides several useful modalities, such as location browsing, map searching, route identifying, and route navigation operations. However, in other embodiments, the mapping application does not employ all of these modalities. For instance, in some embodiments, the mapping application does not provide route navigation.

In order to display immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

In order to specify intersections, some embodiments begin with the road graph data, which includes junctions and 1-D road segments. From this data, the set of servers identifies junctions that stand on their own as intersections as well as sets of junctions that should be combined into a single intersection. The set of servers then stores these intersections for use in generating route data in response to user requests. Furthermore, some embodiments modify the intersection data to conform to specifics of a route before providing the intersection data to a requesting user device.

Once generated on the mapping service side, the tiles are used by a mapping application on a client device to present 3D maps to users of the client devices. The mapping application of some embodiments uses a variety of novel techniques to present a 3D presentation of a map while the map is being browsed or while the map is providing a navigation presentation. For instance, the mapping application renders the 3D presentation from the vantage point of a virtual camera, and uses various methods for moving the virtual camera (i.e., moving the perspective rendering position) automatically in certain situations to achieve a desired 3D presentation. One such example occurs when the mapping application of some embodiments moves the position of the virtual camera from a perspective rendering position behind a current position of a moving device to a top-down view of the current position when the device is about to make a turn along a route. Another example is the zoom in/out animations that are provided, which show objects in the scene growing and shrinking with the zoom in operation and the zoom out operation.

Also, in some embodiments, the mapping application provides two different types of 3D presentations—an immersive 3D presentation and a non-immersive 3D presentation. The immersive presentation in some embodiments not only displays more geometries but also displays more details for the geometries that are displayed in the non-immersive presentation. The mapping application also provides smooth transitions between the non-immersive and immersive presentations.

To achieve such smooth transitions and generate other novel effects, the mapping application of some embodiments uses a novel image processing pipeline. This pipeline performs a variety of pre-load operations to download, retrieve and/or decompress map tiles that may be needed for a navigation presentation, to prepare its rendering pipeline for its rendering operations, and to prepare a duplicate pipeline to smoothly transition between the immersive and non-immersive 3D presentations. The virtual camera and rendering aspects of the mapping application of some embodiments are described in detail in the U.S. Provisional Patent Application 61/699,855, entitled "Rendering Maps", filed Sep. 11, 2012; and concurrently filed U.S. Patent Application 13/632,040, entitled "Virtual Camera for 3D Maps", and now published as U.S. Patent Publication 2013/0321401. The Provisional Application 61/699,855 and the above-mentioned concurrently filed Patent Application are incorporated herein by reference.

Section I below describes the mapping application of some embodiments of the invention. Section II next describes server side operations for generating the road and intersection data. Section III then describes electronic devices that employ the mapping application of some embodiments. Section IV lastly describes location services uses by some embodiments of the invention.

I. Navigation User Interface

A. Start

The navigation application of some embodiments is part of an integrated mapping application that includes several useful modalities, including location browsing, map searching, route identifying and route navigating operations. This integrated application (referred to below as the mapping application, the navigation application or the integrated application) in some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

FIG. 1 illustrates an example of a device 100 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows six stages 105, 110, 115, 117, 119, 121 of interaction with the mapping application. The first stage 105 shows a device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments (1) displays a map of the current location of the device, and (2) several UI controls arranged in a top bar 140, and as floating controls. As shown in FIG. 1, the floating controls include an indicator 145, a 3D control 150, and a page curl control 155, while the top bar 140 includes a direction control 160, a search field 165, and a bookmark control 170.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g. 'Wo' or 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows locations and routes to be bookmarked by the application. The position indicator 145 allows the current position of the device to be specifically noted on the map. Once this indicator is selected once, the application maintains the current position of the device in the center of the map. In some embodiments, it can also identify the direction to which the device currently points.

The 3D control 150 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 155 is a control that allows the application to minimize the number of on-screen controls, by placing certain less frequently used actions in a secondary UI screen that is accessible through the "page curl" control that is displayed on the map. In some embodiments, the page curl is permanently displayed on at least some of the map views that the application provides. For instance, in some embodiments, the application displays the page curl permanently on the starting page (illustrated in second stage 110) that it provides for allowing a user to browse or search a location or to identify a route.

The direction control 160 opens a direction entry page 180 through which a user can request a route to be identified between a starting location and an ending location. The third stage 115 of FIG. 1 illustrates that the selection of the direction control 160 opens the direction entry page 180, which is shown in the fourth stage 117. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

The fourth stage 117 shows that the direction entry page 180 includes starting and ending fields for providing starting and ending locations for a route, and a table that lists recent routes that the application has provided to the user. Other controls on this page are controls for starting a route, for reversing the order of the start and end locations, for canceling the direction request, and for picking walking, auto, or public transit routes. These controls and other aspects of the mapping application are described in U.S. Provisional Patent Application 61/656,080, entitled "Integrated Location Browsing, Map Searching, Route Identifying, and Route Navigating Application", filed Jun. 6, 2012; U.S. Provisional Patent Application 61/699,841, entitled "Problem Reporting", filed Sep. 11, 2012; and concurrently filed U.S. Patent Application 13/632,102, entitled "Problem Reporting in Maps", and now published as U.S. Patent Publication 2013/0326407. The Provisional Applications 61/656,080 and 61/699,841, as well as the above-mentioned concurrently filed Patent Application, are incorporated herein by reference.

The fourth stage illustrates the user selecting one of the recent directions that was auto-populated in the table 182. The fifth stage 119 then shows three routes on a 2D map view between the specified start and end locations specified through the page 180. It also shows the selection of the second route and some information about this route in a bar at the top of the layout. This bar is shown to include start and end buttons. The start button is shown to be selected in the fifth stage.

As shown by the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 184 that identifies the distance from the current location of the device to the next maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be located along a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 184 to the top edge of the presentation a short time period after starting the navigation presentation. In some embodiments, the application requires the user to tap on the navigated map to bring back the top bar, its controls and the floating controls, and requires another tap to remove these controls again from the map. Other embodiments provide other mechanisms for viewing and removing these controls. The navigation user interface and other aspects of the navigation mode of some embodiments are described in greater detail in U.S. Provisional Patent Application 61/655,997, entitled "Route Navigating Method and Apparatus", filed Jun. 5, 2012; U.S. Provisional Patent Application 61/657,864, entitled "Route Navigating Method and Apparatus", filed Jun. 10, 2012; U.S. Provisional Patent Application 61/699,851, entitled "Voice Instructions During Navigation", filed Sep. 11, 2012; and concurrently filed U.S. Patent Application 13/632,121, entitled "Context-Aware Voice Guidance" and now published as U.S. Patent Publication 2013/0322634. The Provisional Applications 61/655,997, 61/657,864, and 61/699,851, as well as the above-mentioned concurrently filed Patent Application, are incorporated herein by reference.

B. 2D and 3D Navigation

Figure 2:
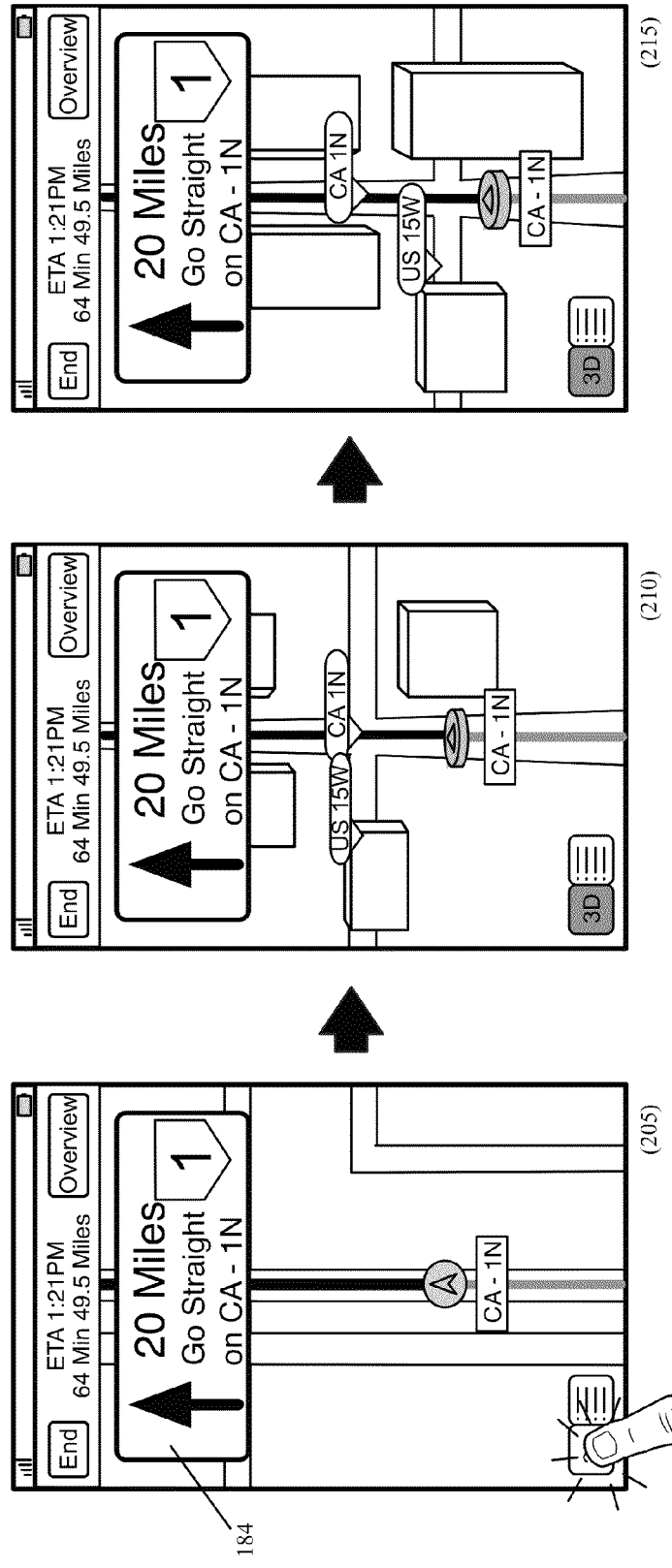
FIG. 2 illustrates how the navigation application of some embodiments provides a 3D control as a quick mechanism of entering a 3D navigating mode.

The navigation application of some embodiments can display a map for navigation in either a 2D mode or a 3D mode. As mentioned above, one of the floating controls is the 3D control 150 that allows a user to view a navigation presentation in three dimensions (3D). FIG. 2 illustrates how the navigation application of some embodiments provides the 3D control 150 as a quick mechanism of entering a 3D navigating mode. This figure illustrates this operation in three stages 205-215. The first stage 205 illustrates the user selecting the 3D control 150 while viewing a two-dimensional navigation presentation.

The second stage 210 illustrates the navigation presentation in the midst of its transition into a 3D presentation. As shown in this figure, the 3D control appears highlighted at this stage to indicate that the navigation presentation has entered a 3D mode. In some embodiments, the navigation application generates the 3D view of the navigated map by rendering the map view from a particular position in the three dimensional scene that can be conceptually thought of as the position of a virtual camera that is capturing the map view. This rendering will be further described below by reference to FIG. 3.

The third stage 215 then illustrates the navigation presentation at the end of its transition into its 3D appearance. As shown by the difference between the heights of the buildings in the second and third stages, the transition from 2D to 3D navigation in some embodiments includes an animation that shows three dimensional objects in the navigated map becoming larger.

1. Virtual Camera

Figure 3:
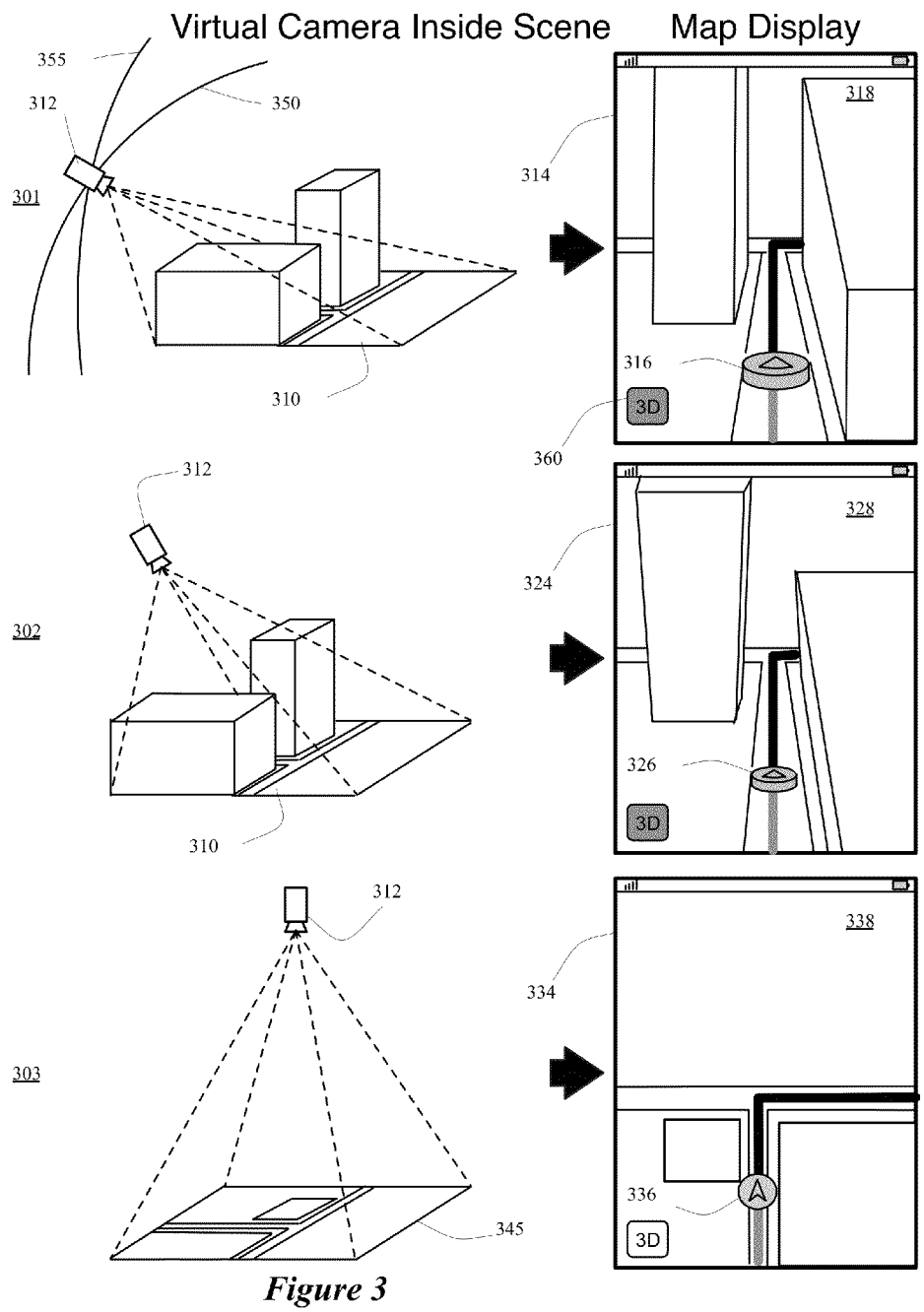
FIG. 3 presents a simplified example to illustrate the concept of a virtual camera.

The navigation application of some embodiments is capable of displaying navigation maps from multiple perspectives. The application can show maps in three dimensions (3D) or in two dimensions (2D). The 3D maps are generated simulations of a virtual scene as seen by a virtual camera. FIG. 3 presents a simplified example to illustrate the concept of a virtual camera 312. When rendering a 3D navigation map, a virtual camera is a conceptualization of the position in the 3D map scene from which the device renders a 3D view of the scene. FIG. 3 illustrates a location in a 3D navigation map scene 310 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 301 shows the virtual camera 312 at a first position pointing downwards at an angle (e.g., a 30° angle) towards the 3D scene 310. By rendering the 3D scene from the position and angle shown in stage 301 the application generates the 3D map view 318. From this position, the camera is pointing at a location that is a moving position in front of the device. The virtual camera 312 is kept behind the current location of the device. "Behind the current location" in this case means backward along the navigation application's defined path in the opposite direction from the current direction that the device is moving in.

The navigation map view 318 looks as though it was shot by a camera from above and behind the device's location indicator 316. The location and angle of the virtual camera places the location indicator 316 near the bottom of the navigation map view 318. This also results in the majority of the screen being filled with the streets and buildings ahead of the present location of the device. In contrast, in some embodiments, the location indicator 316 is in the center of the screen, with half of the screen representing things ahead of the device and the other half representing things behind the device. In order to simplify the figure, no road signs are depicted for the views 318, 328, and 338.

The second stage 302 shows the virtual camera 312 at a different position, pointing downwards towards the scene 310 at a larger second angle (e.g., a 45° angle). The application renders the scene 310 from this angle, resulting in the 3D navigation map view 328. The buildings and the roads are smaller than their illustration in the first navigation map view 318. Once again the virtual camera 312 is above and behind the location indicator 326 in the scene 310. This again results in the location indicator appearing in the lower part of the 3D map view 328. The location and orientation of the camera also results again in the majority of the screen displaying things ahead of the car, which is what someone navigating needs to know.

The third stage 303 shows the virtual camera 312 at a top-down view that looks downwards on a location on a 2D map 345 that corresponds to the location in the 3D map scene 310 that was used to render the 3D views 318 and 328. The scene that is rendered from this perspective is the 2D map view 338. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application, as cropping a portion of a 2D map is not a perspective rendering operation.

At the third stage 303, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 338 illustrated in the third stage 303, because any object that is away from the center of the view is distorted, with the distortions being greater the further the object's distance from the center of the view.

The virtual camera 312 moves along different trajectories in different embodiments. Two such trajectories 350 and 355 are illustrated in FIG. 3. In both these trajectories, the camera moves in an arc and rotates more downward as the camera moves upwards on the arc. The trajectory 355 differs from the trajectory 350 in that in the trajectory 355 the camera moves further away from its point of focus (and the user's current location) as it moves up the arc.

While moving along one of the arcs, the camera rotates to maintain a point ahead of the location indicator at the focal point of the camera. In some embodiments, the user can turn off the three dimensional view and go with a purely two dimensional view. For example, the applications of some embodiments allow a three dimensional mode to be turned on and off by use of a 3D button 360. The 3D button 360 is highly useful to the turn-by-turn navigation feature, where it has a role as an indicator and toggle. When 3D is turned off, the camera will maintain a 2D navigation experience, but when 3D is turned on, there may still be some top-down perspectives when 3D viewing angles don't make sense (e.g., when going around a corner that would be obstructed in 3D mode).

2. User Adjustment of Camera Height

Figure 4:
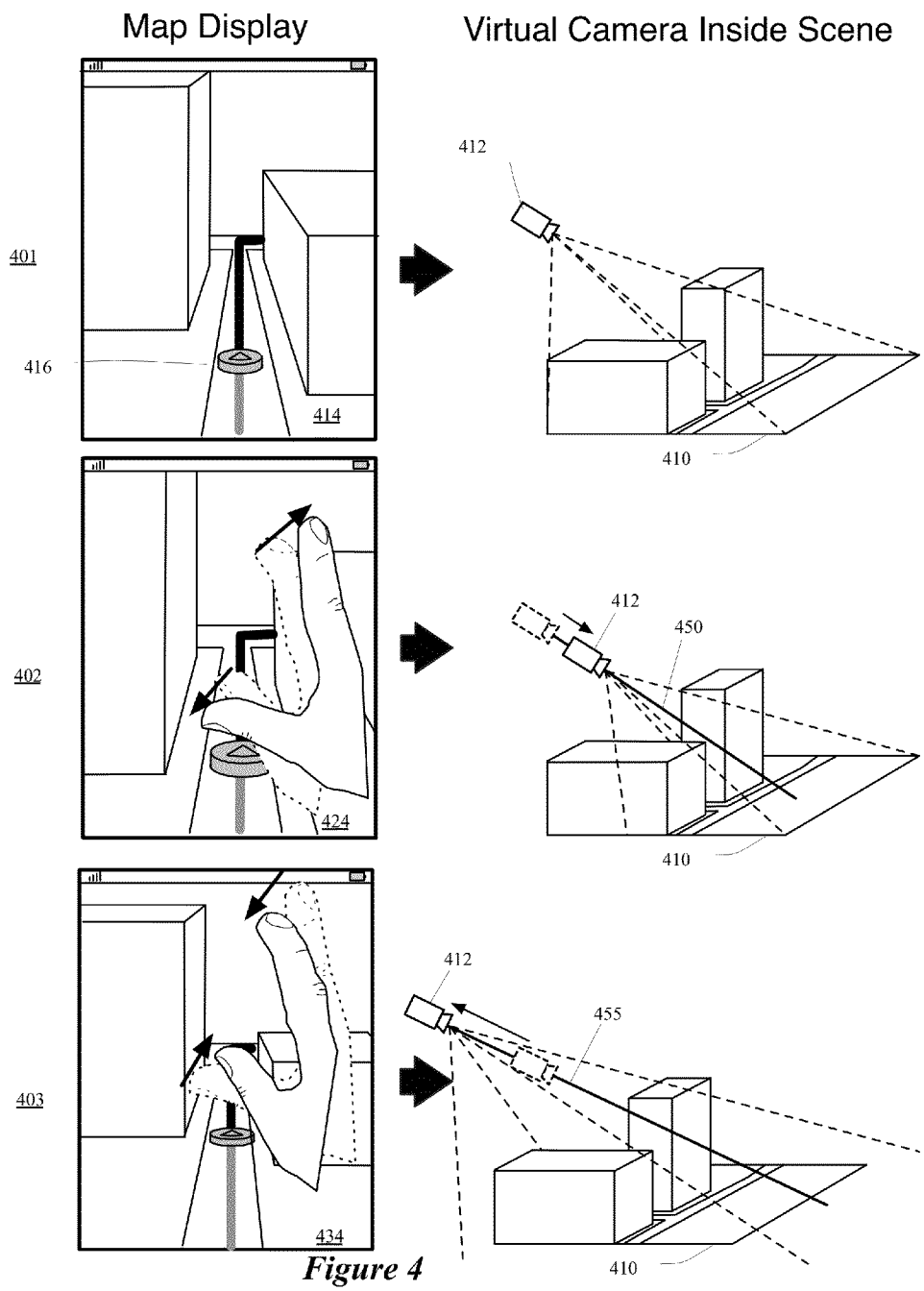
FIG. 4 illustrates the adjustment of the distance of a virtual camera by contracting and expanding gestures.

Besides (or instead of) having the navigation application control the camera (e.g., turning from 3D to 2D when going around corners) some embodiments also allow the user to adjust the level of the camera. Some embodiments allow the user to make a command gesture with two fingers to adjust the distance (height) and angle of the camera. Some embodiments even allow multiple types of gestures to control the camera. FIG. 4 illustrates the adjustment of the distance of a virtual camera by contracting and expanding gestures. The figure is shown in three stages. In stage 401, the application shows a basic scene 410 with a virtual camera 412 at the default level for 3D viewing and the screen view 414 rendered from the scene 410. The basic scene contains two buildings and a T-junction. In stage 401, the buildings are viewed from a 45 degree downward angle and a particular height that makes them seem a particular size. The location indicator 416 is also shown at a particular size.

In stage 402, the user makes a gesture by placing two finger tips 420 near each other on the screen of the device, on the screen view 424 and moving the fingertips apart while they are on the screen. Moving the fingertips 420 apart has the effect of making the map (both the part between the fingers and the rest of the map) larger. In order to make the things in the map appear larger, the application causes the virtual camera 412 to zoom in. In some embodiments, the line 450 along which the mapping application moves the virtual camera 412 is a line formed by the front of the virtual camera 412 and the virtual camera 412's point of focus. The mapping application of some embodiments moves the virtual camera 412 along a line formed by the front of the virtual camera 412 and a location in the 3D map 410 based on the user's input to zoom into (or out of) the view of the 3D map 410.

After zooming in for stage 402, the user decides to zoom out for stage 403. In this stage the user has placed two fingers 430 on the screen and brought them closer together. Bringing the fingers closer together has the effect of shrinking the map (both the part between the fingers and the rest of the map). The zoom-out adjustment is accomplished by moving the virtual camera 412 farther away from the 3D map 410 along the line 455. In some embodiments, the line 455 along which the mapping application moves the virtual camera 412 is a line formed by the front of the virtual camera 412 and the virtual camera 412's point of focus. The mapping application of some embodiments moves the virtual camera 412 along a line formed by the front of the virtual camera 412 and a location in the 3D map 410 based on the user's input to zoom into (or out of) the view of the 3D map 410.

Rendering a 3D map view using the virtual camera 412 at this position results in a 3D map view 434 in which the buildings and the roads appear farther than the position illustrated in the 3D map view 424. As shown by the dashed-line version of the virtual camera 412, the virtual camera 412 moved farther from the 3D map 410 along the line 455.

Figure 5:
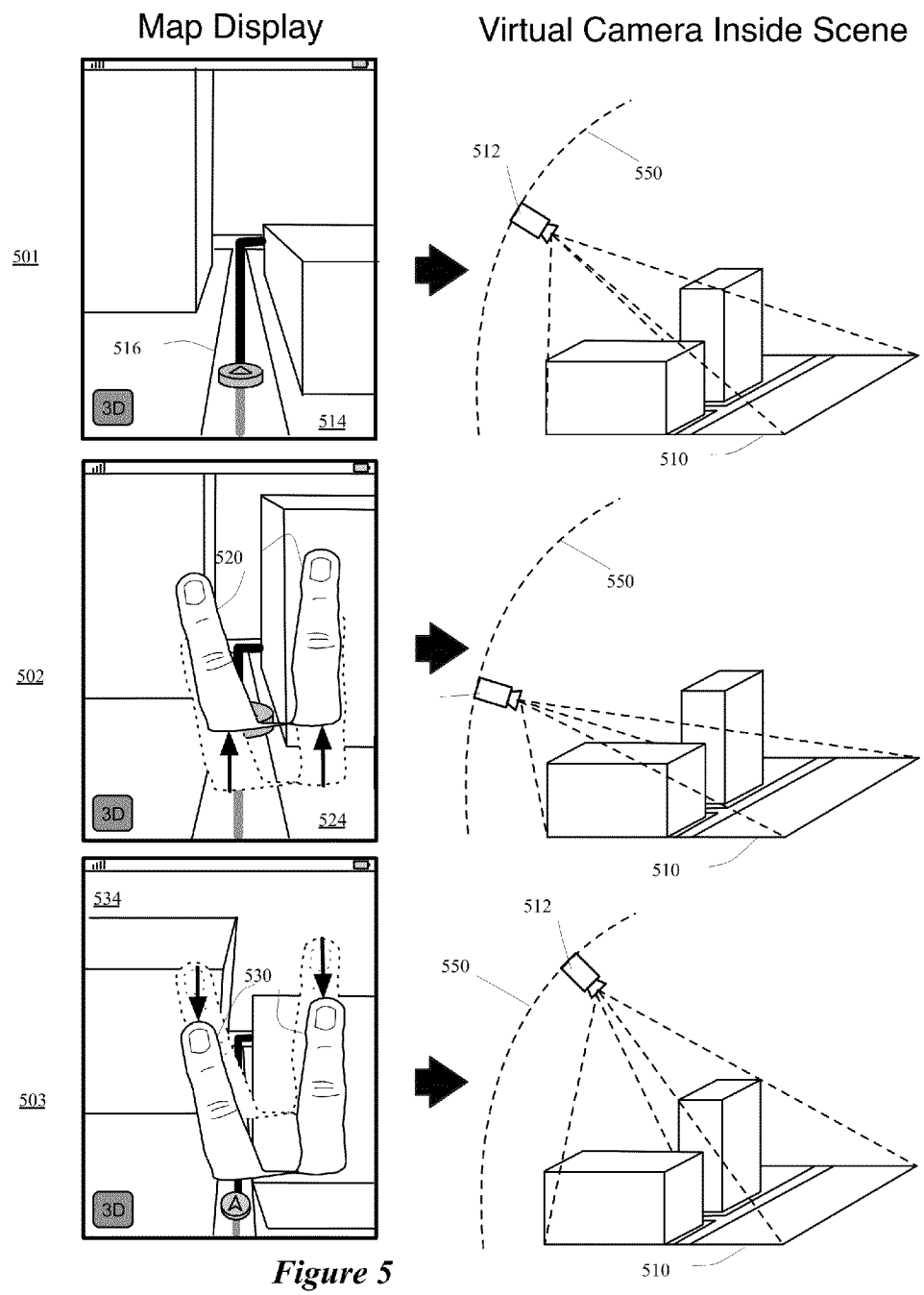
FIG. 5 illustrates an embodiment of a camera the angle of which can be adjusted by gestures.

In addition to being controllable by zooming in and out, some applications allow a user to change the angle of the virtual camera. FIG. 5 illustrates an embodiment of a camera the angle of which can be adjusted by gestures. The figure is shown in three stages 501-503. In stage 501, the camera is pointing downward at 45 degrees at scene 510. Scene 510 contains two buildings and a T-junction which are shown in screen view 514. The buildings are shown from a particular angle and a particular size. The location indicator 516 is also shown at a particular size.

In stage 502, the user has placed two fingers 520 on the screen approximately horizontal to each other and dragged up. This has the apparent effect of dragging the scene up with the fingers. The scene rising is accomplished by the virtual camera 512 lowering and changing its viewing angle from 45 degrees to 30 degrees. In the screen view 524, the buildings and the location indicator look taller than in stage 501.

After the user drags the scene up in stage 502, the user then drags the scene down in stage 503. To do this, the user again places two fingers 530 on the screen and drags downwards. This drags the scene down along with the fingers 530. The scene dropping is accomplished by the virtual camera 512 rising and changing its angle with the scene 510 to 60 degrees downward. In stage 503, the camera 512 has moved farther up and is angled down more than in stage 501. Accordingly, the buildings and location identifier 536 again look even shorter and smaller in stage 503 than in stage 501.

In some embodiments, the mapping application provides an inertia effect for different operations (e.g. panning, rotate, entering from 2D to 3D). When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world.

The application of some embodiments allows the distance and angle of the camera to be independently controlled. For example, it allows the distance to be controlled by the contracting and expanding finger gestures and the angle to be controlled by the dragging of horizontally placed fingers. Other embodiments use whichever gesture is being performed to set either a distance or an angle of the camera, with the other variable being set automatically. While FIGS. 4 and 5 show gestures performed in a certain direction leading to certain results, in some embodiments, one or both of these gestures could be reversed. For example, in some embodiments, dragging horizontally placed fingers down may bring the camera down rather than bringing the scene down. That would have the effect of moving the scene down when the fingers move up and moving the scene up when the fingers move down.

II. Server Side Generation of Road and Intersection Data

In order to display both immersive and non-immersive 3D map presentations, some embodiments have to generate a variety of tiles for client devices to render to generate roads, building, and surrounding scenery. In some embodiments, examples of such tiles include road and building tiles used for non-immersive 3D presentations, and navigation and building tiles used for immersive 3D presentations.

Before generating these tiles, a set of servers has to generate the description of the road, building, and other geometries that are placed in each of the tiles. This task involves multiple sub-tasks such as (1) receiving map data from a variety of vendors, (2) processing such data to produce one dimensional (1D) roads, (3) smoothing the 1D road graphs, (4) defining data to specify intersections, (5) generating 2D road geometries and land cover, (6) smoothing the 2D road geometries, (7) generating data (e.g., estimated height data) regarding buildings, (8) using such data to define building geometries, (9) constructing road geometries details (such as islands, lane markings, and distances and land cover between road geometries), and (10) identifying geometry edge node characteristics and propagating such characteristics.

The mapping service of some embodiments generates downloadable map tile data through offline processing of map data (e.g., data received from map vendors). In some embodiments, this offline processing takes map object location input (e.g., latitude/longitude data for roads, administrative boundaries, natural boundaries, etc.) and generates aggregated roads and relationships between the aggregated roads. From the aggregated roads and their relationships, the mapping service processing generates road geometries. The mapping service also generates geometries for land cover (e.g., parks, oceans, states, etc.) using the map object location input. Some embodiments use scalable distributed processing to create downloadable map tiles from the geometric vector data. One of ordinary skill in the art will recognize that the "offline" processing described in this application may be performed by mapping service computing devices that are in fact connected to the network through which the mapping application requests tile data, but is used to represent that the processing is not performed in response to user requests for tiles.

A. Road Data and Road Graph Generation

Figure 6:
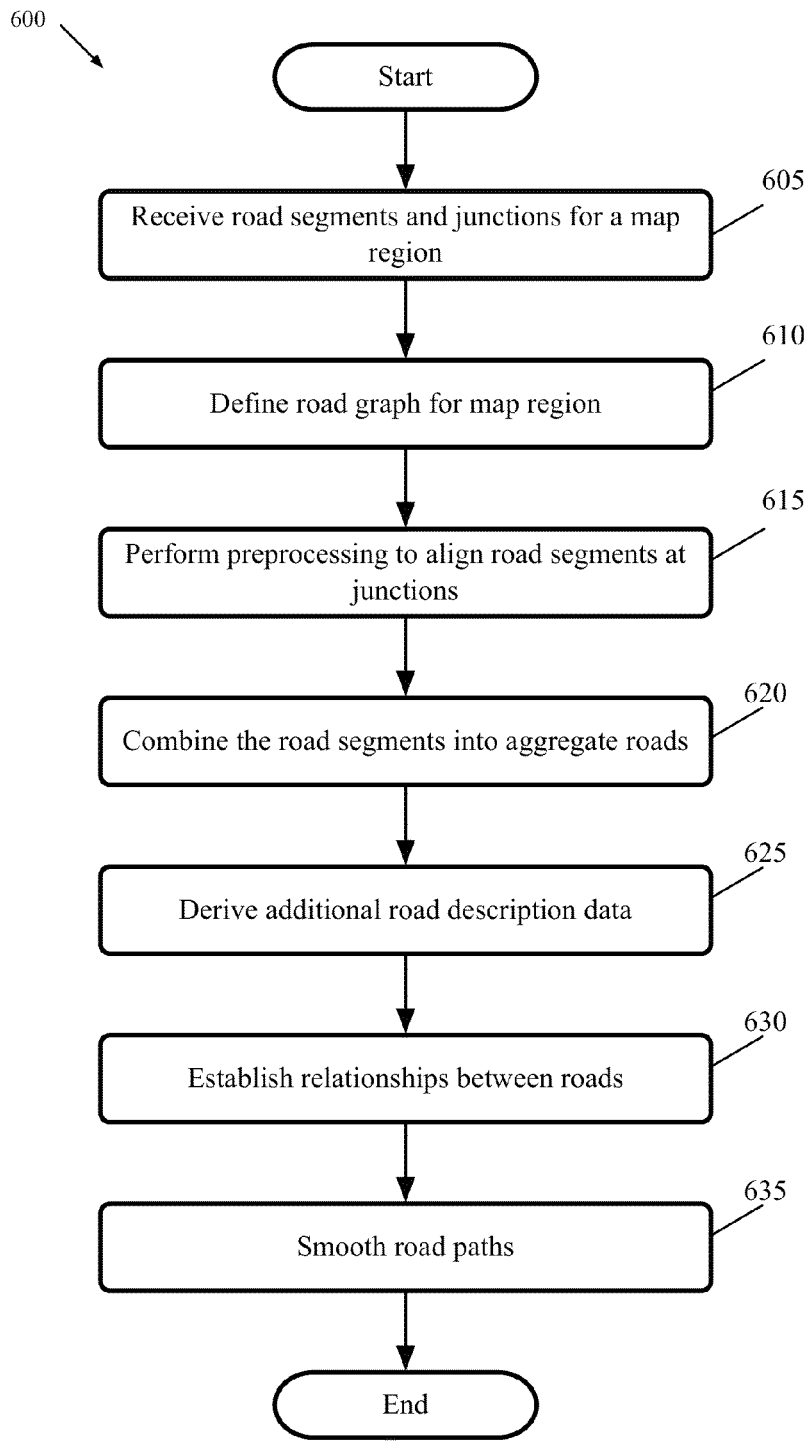
FIG. 6 conceptually illustrates a process of some embodiments for generating a road graph.

Some embodiments receive road segment data (i.e., from one or more sources) and generate a road graph from the road segments. FIG. 6 conceptually illustrates a process 600 of some embodiments for generating a road graph. The process 600 will be described by reference to FIG. 7, which illustrates various data structures of some embodiments for the roads within a map region. These data structures, which will be described in greater detail below, include road segments 700, edges 705, roads 710, junctions 715, and a road graph 720.

As shown, the process 600 begins by receiving (at 610) a set of road segments and junctions for a map region. In some embodiments, the process 600 (or a similar road graph generation process) is run separately for different map regions (e.g., for states, rectangular geographic areas, land masses, etc.). The road segments for a map region may be received from a single source or from several different sources. In some embodiments, a road segment is a consistent stretch of road that has a single consistent set of attributes (i.e., same number of lanes, speed limit, etc.). When a road attribute changes (e.g., speed limit changes from 45 mph to 35 mph, or a lane is added), a new road segment is defined.

The junctions for a map region are generally received from the same source as the roads that meet at the junctions. In some embodiments, a junction defines an intersection of at least two roads—i.e., that two or more road segments not only cross the same location (which can be determined from the road segment data) but also that the road segments actually intersect each other so that a vehicle can transition from one road segment to the other at the junction.

Figure 7:
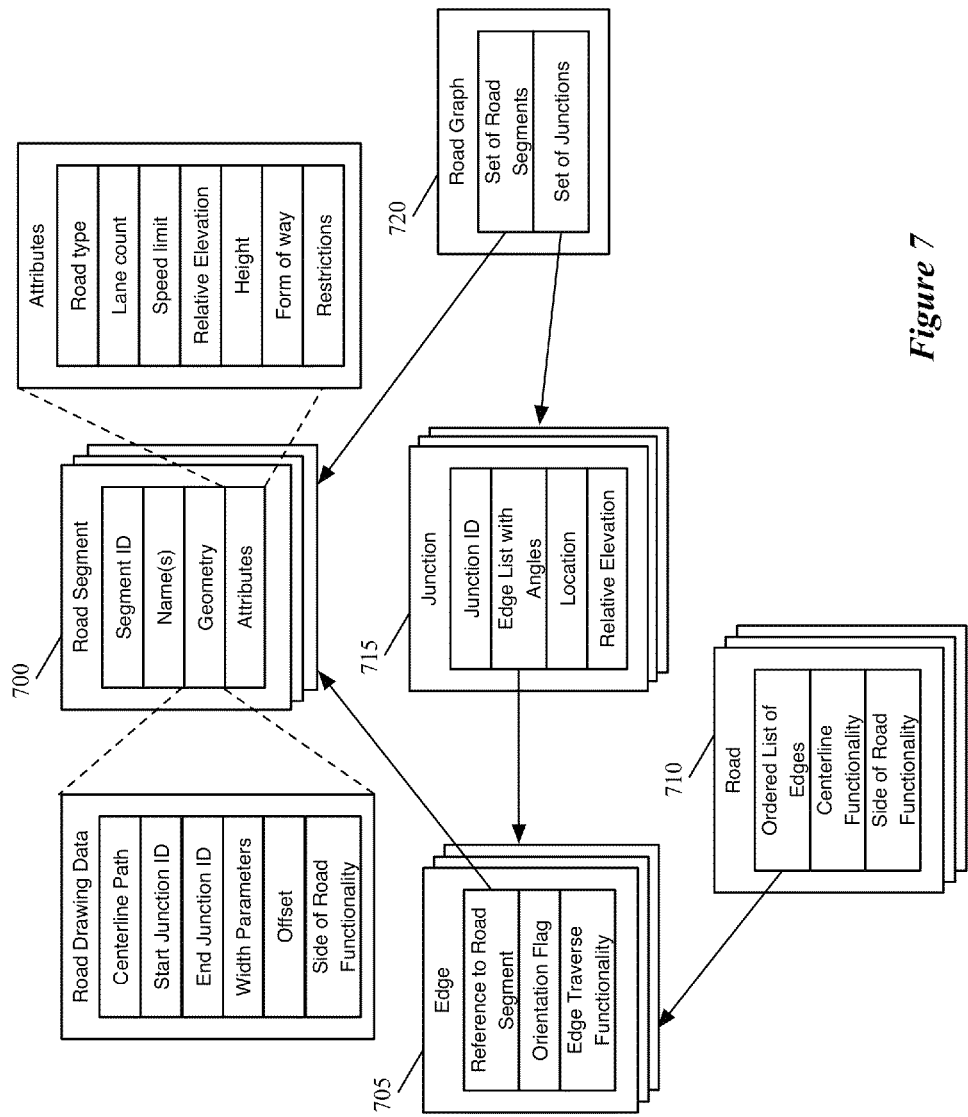
FIG. 7 illustrates various data structures of some embodiments for the roads within a map region.

FIG. 7 illustrates the data structure 700 of some embodiments for a road segment as well as the data structure 715 for a junction. As shown, the road segment includes a segment ID (i.e., a unique identification), one or more names, geometry information, and attribute information. The geometry information (which is different than the road geometries created for defining vector data) defines the path and other geometric information about a road segment. As shown, the geometry information includes centerline path data (e.g., an ordered string of coordinates that define the center of the road), start and end junction information, parameters to indicate the width and offset with respect to the centerline, and functionality enabling evaluation of the sides of the road at any point along the road segment. In some embodiments, this is a function on the road segment class that utilizes the centerline, offset, and width information to calculate the location of the sides of the road. While this diagram shows the road drawing data including start and end junctions, some embodiments do not define one as the start and one as the end, but rather simply indicate two junction IDs as endpoints (or a single junction ID if the road segment dead-ends).

The attribute information describes metadata about the road segment, such as the road type (or functional road class, which defines the level of importance of a road, from freeway down to pseudopath), the number of lanes, the speed limit, the relative elevation of the road (which may contain references to one or more other road segments and/or junctions, indicating that the present road segment runs below or above the referenced object), the height of the road (relevant for identifying elevation), the form of way (which defines a path as a dual carriageway, single carriageway, walkway, stairs, connector road, slip road, etc.), restrictions (e.g., toll restrictions, vehicle type restrictions, indications that a road is private, etc.).

In addition, as shown in FIG. 7, some embodiments define an edge 705 for each road segment. An edge data structure contains a reference (e.g., a pointer) to a road segment to which the edge corresponds, an orientation flag that indicates whether the edge is oriented in the same direction as the road segment, and a functionality to calculate the right and left sides of the edge using the width and centerline data of the referenced road segment. In some embodiments, this functionality exists as a function on the edge class. The edges, in some embodiments, are data constructs used to create the road graph. For a road segment that has both a start and end junction, some embodiments define two edges (one in each direction), so that each junction can reference an edge leading out from the junction.

As shown in FIG. 7, the junction data structure 715 includes a unique junction ID, an ordered list of edges with associated angles, a location, and an elevation order. While this data structure shows an edge list, some embodiments additionally include a list of road segments referred to by the segment IDs, from which the edge list is generated. In some embodiments, the junction ID, list of segment IDs, and elevation order are received from the road data source, while the angles and edge list are calculated by the mapping service. As each road segment is associated with one or more edges, the mapping service processing can determine the appropriate directed edges to list for the junction (the edges directed away from the junction). For many surface street junctions, the relative elevation is not especially meaningful, as the junction and all roads at the location will be at the same level. However, at intersections such as interchanges, or when a road segment passes under or over a freeway, the elevation order indicates which junctions are on top of other junctions and/or road segments.

After receiving the road segments, the process defines (at 610) a road graph for the map region from the road segments and junctions. As shown in FIG. 7, the road graph data structure 720 includes a set of road segments and a set of junctions. In some embodiments, the application traverses the edges and junctions to identify connected sets of edges, then maps these edges to the road segments. Other embodiments use the start and end junctions stored in each of the road segments, and the list of segments stored for each junction to define the connectivity of the segments and junctions. Some embodiments define a single road graph for a map region. However, some embodiments will define multiple road graphs when there are multiple connected sets that do not intersect.

Next, the process 600 performs (at 615) preprocessing on the road graph to align road segments at junctions. In order to identify angles of roads at junctions properly, and to generate polygon geometries for the roads, the roads intersecting at a junction should all end/start at exactly the same location. However, the road centerline for each of the segments that meet at a particular junction may not end at the exact same location in the received map data. Thus, for each junction, some embodiments calculate an average position of the segment path ends, and assign this position to the junction for its location. In addition, the mapping service processing modifies the road segment path data for each of the segments that meet at the junction so that the centerlines all end at the calculated average position.

Figure 8:
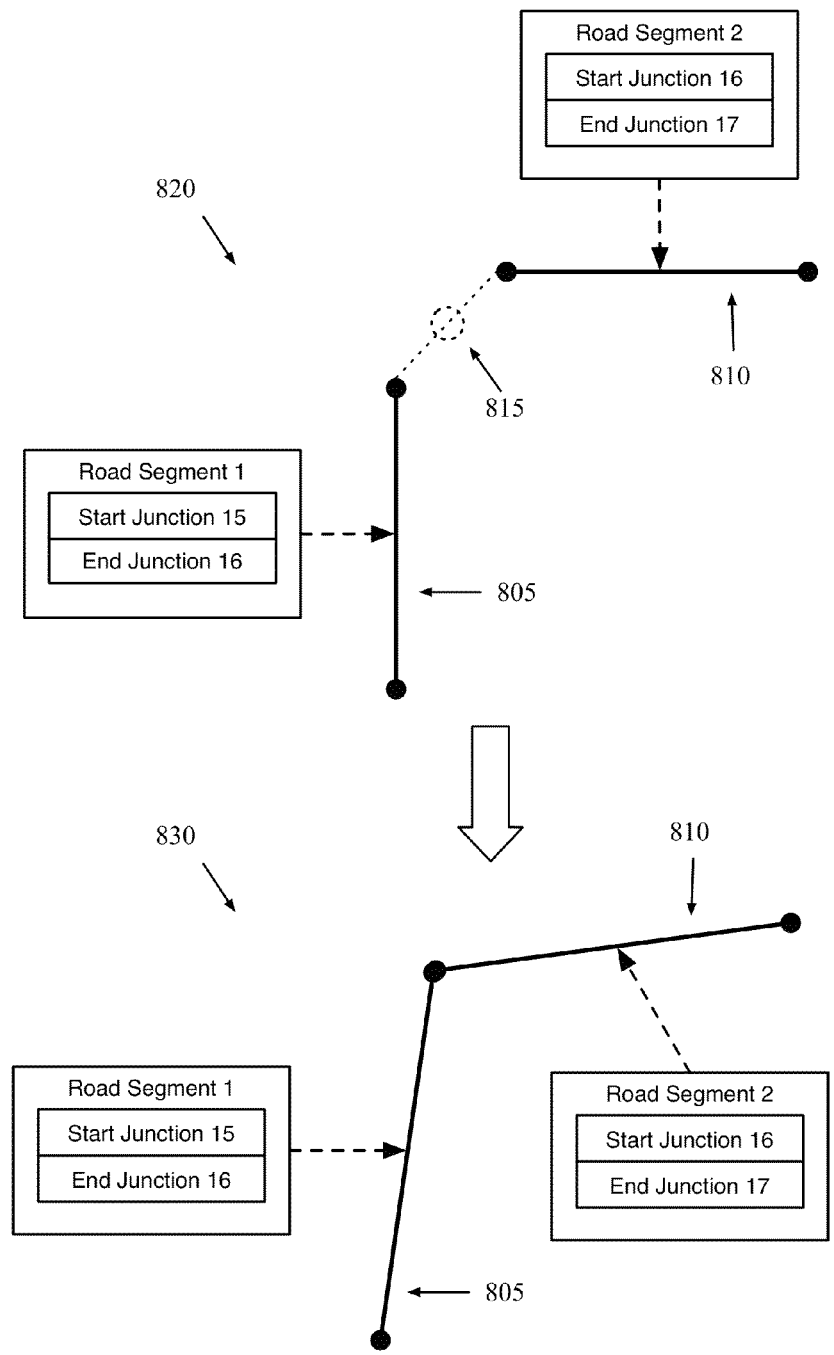
FIG. 8 illustrates an example of a modification for two road segments that meet at a junction.

FIG. 8 illustrates an example of such a modification for two road segments 805 and 810 that meet at a junction, over two stages 820 and 830. As shown, each road segment includes a start junction and an end junction, with the end junction of the first road segment 805 and the start junction of the second road segment 810 being the same (both referring to a junction with an ID of 16). However, as shown in the first stage 820, the centerline paths of the first road segment 805 and the second road segment 810 do not start/end at the same place (and, in fact, do not intersect at all). Thus, some embodiments identify the average position of the ends that should meet. For a junction with only two road segments, this location will be halfway along a line between the two path endpoints, as shown by location 815 in the figure. Each of the ending vertices of the centerlines has a pair of coordinate values (e.g., (x,y) coordinate values, or geolocation coordinates (latitude, longitude)). Some embodiments calculate an average among all of the ending vertices for each coordinate, and use this as the average location for the junction.

After identifying the junction location, the mapping service processing modifies the road segments so that the centerlines all end at the identified location. The second stage 830 shows one example of such a result. In some embodiments, when the road segments are received, the centerline paths may not have vertices at fixed distances. The mapping service processing of some embodiments standardizes the road segment vertices so that each vertex is at a fixed distance (e.g., 10 meters), enabling smoother (less kinked) road polygons. Some embodiments, for a particular road segment, identify a vertex a fixed distance from the end (e.g., 50 meters, 100 meters, etc.) and hold this point fixed, while modifying the other vertices between this point and the end vertex. In some embodiments, the vertices are moved by a lesser amount as they get further away from the endpoint. That is, a vector is calculated for the movement of the end vertex to the identified location, and the other vertices are moved by smaller iterations of this vector.

With preprocessing complete, the process combines (at 620) the road segments into aggregate roads. Some embodiments determine when road segments are in fact different portions of the same road, so that the segments can be treated as a single road for the purposes of defining a map (e.g., for generating labels) and for certain aspects of generating polygons for the roads. In some embodiments, the process uses various attribute and geometry data of the segments to determine whether two segments should be combined.

Some embodiments traverse the road graph to combine the road segments into aggregate roads. While traversing the graph, entering a junction from a particular road segment, the mapping service processing determines which of the other segments is a best match to be a continuation of the current road segment. Some embodiments score each of the segments and aggregate the roads in a greedy fashion.

To compute a score for a particular segment, the mapping service processing evaluates the difference in angle between the incoming road segment and the particular segment, the compatibility of the road segment names, and compares the road attributes. For the angle, the closer the segment is to 180° (i.e., a continuation straight through the junction), the higher the segment will generally score; typically, a road will continue straight or approximately straight through a junction, rather than turning. Some embodiments perform a fuzzy comparison between the road names associated with each segment. That is, the processing compares the string for the incoming road segment with the particular road segment using approximate string matching techniques. In some cases, one or more of the road segments may have multiple names, and the processing performs comparisons of each to find the best match or matches, and uses these best matches in computing the score (e.g., using the comparison of "San Diego Freeway South" to "San Diego Freeway South" rather than to "1-405 South").

In addition, at least some of the road attributes are compared to compute the comparison score in some embodiments. For instance, the mapping service processing of some embodiments compares the road type (i.e., highway, arterial road, minor road, etc.), number of lanes, speed limit, form of way (i.e., single carriageway, dual carriageway, etc.). Once the scores are computed, some embodiments select the segment with the highest score and determine whether it is above a threshold for continuing the road. In addition, some embodiments identify the selected best road segment, and perform a comparison between the selected road segment and each of the other segments. Only if a first segment is the best match for a second segment and the second segment is the best match for the first segment does the processing aggregate the roads. This prevents an incoming road segment that actually ends at a "T" intersection from being joined with one of the road segments that actually continues through the intersection.

Figure 9:
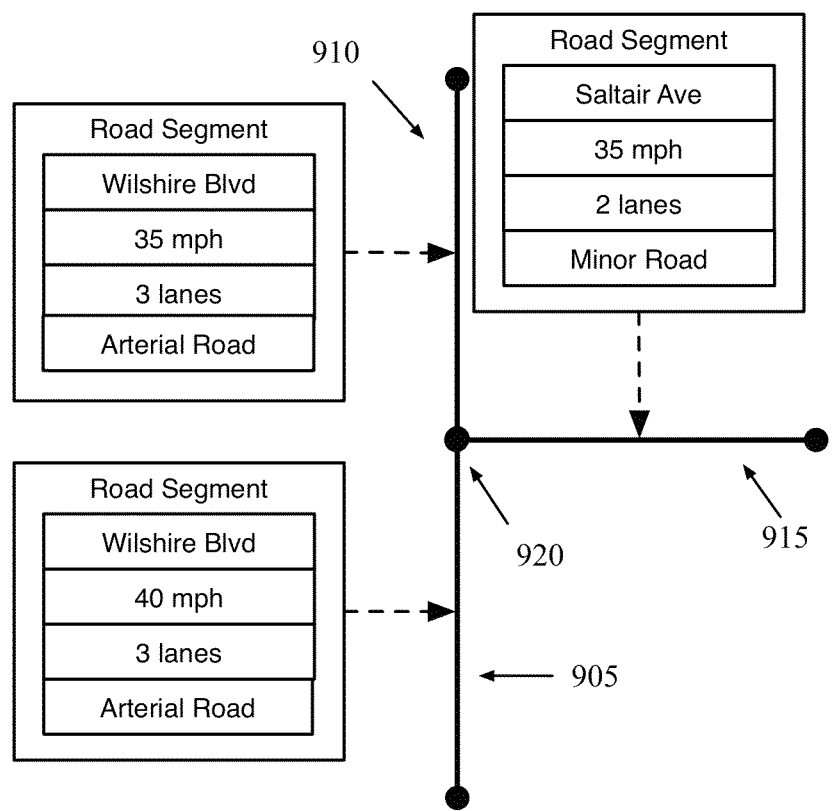
FIG. 9 illustrates an example of three road segments that are candidates for aggregation into a road at a junction.

FIG. 9 illustrates an example of three road segments 905, 910, and 915 that are candidates for aggregation into a road at a junction 920. As shown, the first segment 905 has the name "Wilshire Blvd", a speed limit of 40 mph, and three lanes, and is an arterial road. The second segment 910 also has the name "Wilshire Blvd" and three lanes, and is also an arterial road, but has a speed limit of 35 mph. The third segment 915 has the name "Saltair Ave", a speed limit of 35 mph, and 2 lanes, and is characterized as a minor road. If the initial incoming segment is the third segment 915, then the segment 910 would be the higher-scoring road segment of the two possible continuations. However, for the second segment 910, the third segment 915 will not be the optimal road continuation, as the first segment 905 will have a much higher continuation score (the angle, road name, road type, and number of lanes are the same, and the only difference is the 5 mph in speed limit). As such, the optimal result at this junction 920 is for the road of which the third segment 915 is a part to terminate, with the first segment 905 and second segment 910 linked together as a single road. Other embodiments do not perform the reciprocity test, but instead set a high enough threshold that bad matches are unlikely. Furthermore, while traversing the road graph, some embodiments allow a segment to be moved from one aggregate road to another when a better match occurs later in the traversal (e.g., if road segment 915 is found to continue on into road segment 910, but then the junction 920 is reached again via road segment 905, the segment 910 may be moved from the first road to a new road that also contains road segment 905.

FIG. 7 illustrates a road data structure 710 of some embodiments. As shown, the road data structure 710 includes an ordered list of edges (through which the road object contains references to its constituent segments). In addition, the road structure contains functionality to evaluate the road centerline and the sides of the road at any point along the road. In some embodiments, the centerline functionality exists as a function of the road class that refers to the centerline information of the constituent segments (and may also interpolate between any slightly mismatched centerlines). The side of road functionality also exists as a function of the road class, that uses the side of road function from the road segment objects contained by the road object.

Returning to FIG. 6, after combining the road segments, the process 600 derives (at 625) additional road description data. In some embodiments, this involves filling in missing data in the road segment information. As some embodiments implement the road segments (and other data) as objects, in some cases the object variables will have null values because the data has not been provided by the map data provider. For instance, speed limit data, road width, number of lanes, or other parameters may be missing. Some embodiments automatically fill in values for at least some of the missing data of a road segment when possible, either using other information from the road segment or information from neighboring road segments. For example, some embodiments might fill in missing speed limit information for a road segment based on the speed limits of the neighboring segments (e.g., if a first segment has a speed limit of 55 mph and a third segment has a speed limit of 35 mph, then the middle segment could be filled in with a 45 mph speed limit).

Other embodiments only fill in data necessary for generating the road geometry, such as the number of lanes and road width information. For example, some embodiments may use neighboring road segments within an aggregated road to generate the number of lanes (e.g., if segments on either side of a particular segment have a particular number of lanes, that particular number of lanes may be assigned to the particular segment as well). For the road width, some embodiments use the number of lanes (if it exists) to assign a width to the road (e.g., assume that each lane is 4 meters wide). On the other hand, some embodiments assign road widths based on the road type (i.e., freeways have a first width, major arterials have a second width, etc.). In fact, some embodiments derive the number of lanes from the road type (e.g., freeways always assigned three lanes, etc.), then generate the width based on the number of lanes.

In addition, some embodiments fill in missing data for height, or elevation, information. As described above, in some cases the map data specifically indicates that a particular road segment passes over (or under) another road segment, or over (or under) a junction, or that a particular junction passes over (or under) another junction. However, this relative elevation data may be missing in some cases. When a first segment (or junction) and second segment (or junction) have centerline paths that intersect in a flat plane, but for which no junction is defined, then the paths must be at different elevations. When the absolute elevation data is included from the map data provider, this data can be used to ascertain the relative elevation data (i.e., defining a relationship that a first segment with lower absolute elevation passes under a second segment with a higher absolute elevation.

Figure 10:
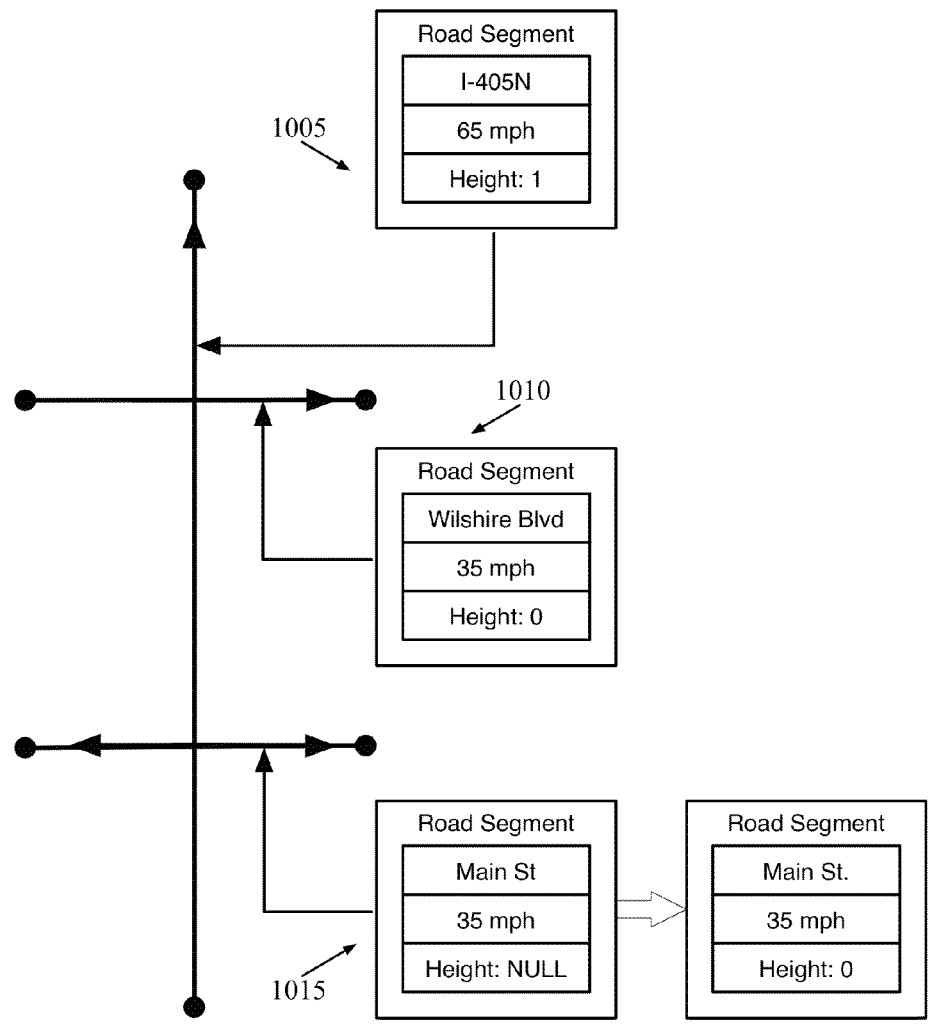
FIG. 10 illustrates a situation in which a first road segment is intersected (in a plane) by a second road segment and a third road segment.

When relative elevation data cannot be ascertained for a particular set of road segments that intersect in the plane but do not meet at a junction, some embodiments create a random relative ordering for segments. In other embodiments, a likely relative ordering may be derived from road types of the non-intersecting roads, but may also use attributes of other nearby road segments. FIG. 10 illustrates a situation in which a first road segment 1005 ("I-405N") is intersected (in a plane) by a second road segment 1010 ("Wilshire Blvd.") and a third road segment 1015 ("Main St."). However, in this case the map data does not indicate any junctions between these road segments. The I-405N segment has a height of 1 while the Wilshire segment has a height of 0. However, the Main St. segment has a null height (i.e., this information is not provided). Based on the fact that the I-405N segment travels over the Wilshire Blvd. segment, some embodiments also assume that the I-405N will travel over Main St. As such, the mapping service operations automatically fill in the height of the road segment data structure for Main St. with a value of 0, or will fill in a relative ordering indicating that the segment of Main St. travels under the segment of I-405N.

Figure 11:
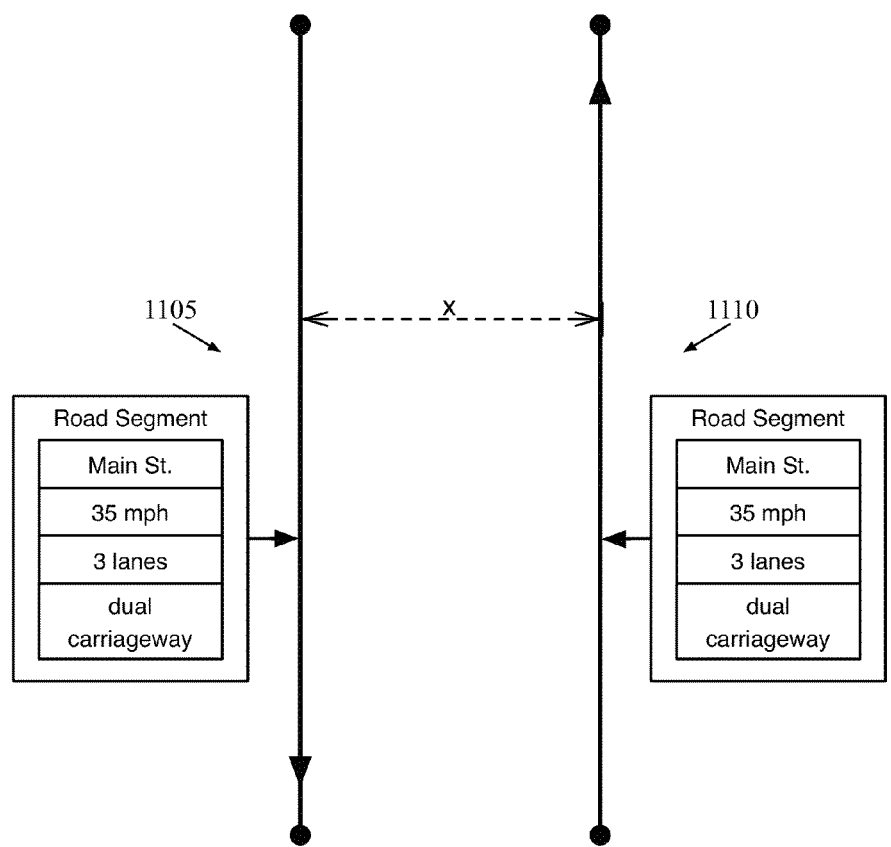
FIG. 11 illustrates two road segments that are a distance X apart, run parallel in opposite directions, and have the same name.

Additionally, the process 600 establishes (at 630) relationships between roads and road segments. In some embodiments, establishing relationships includes identifying semantic data, such as opposite sides of dual carriageway, and defining links between the related roads. In some embodiments, the process identifies roads containing road segments with the same or similar names (e.g., "I-5 N" and "I-5 S"), that are marked as dual carriageways (i.e., in a form of way field), and that are within a threshold distance of each other and a threshold angle of being parallel. FIG. 11 illustrates two road segments 1105 and 1110 that are a distance X apart, run parallel in opposite directions, and are both named "Main St." Assuming that the distance X is less than the threshold distance for roads with the same name, then these roads will be linked as associated dual carriageways, and turns between the roads can be classified as U-turns rather than separate left turns. Additional semantic data that may be propagated includes assigning names to connector/slip roads (e.g., freeway entrances, freeway interchanges, right turn slip roads, etc.).

Lastly, the process 600 generates (at 635) a smoothed version of the roads. In some embodiments, the centerline data may have noise. For instance, a five mile stretch of freeway may in actuality be straight, but the data may have slight back and forth in places. In addition, as the roads are defined as lines between centerline vertices, kinks might appear where the road has a smooth turn in reality. Furthermore, when road segments are joined at junctions, this may create sharp turns that should be smoother in reality. As this sort of noise is unwanted, some embodiments apply a smoothing operation, controlled by road properties, to the roads (e.g., either one road segment at a time, or to aggregate roads) in the road graph. To perform the smoothing, various different operations may be performed by different embodiments. Some embodiments use smoothing operations that move each vertex in the road a distance based on the locations of its neighbor vertices (e.g., Laplacian smoothing).

Figure 12:
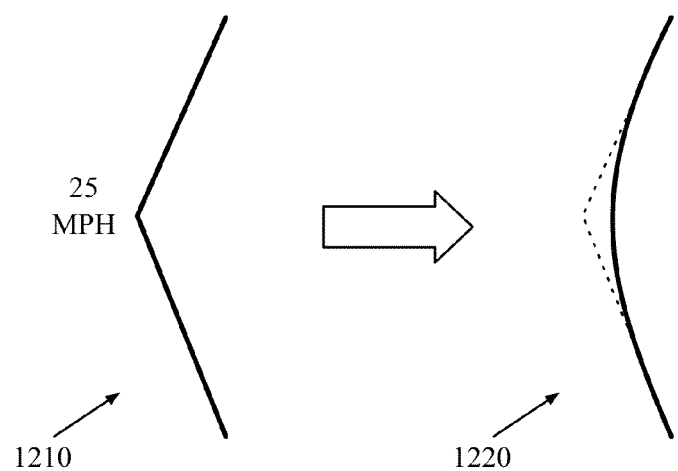
FIGS. 12 and 13 illustrate similarly kinked roads that have speed limits of 25 mph and 60 mph.
Figure 13:
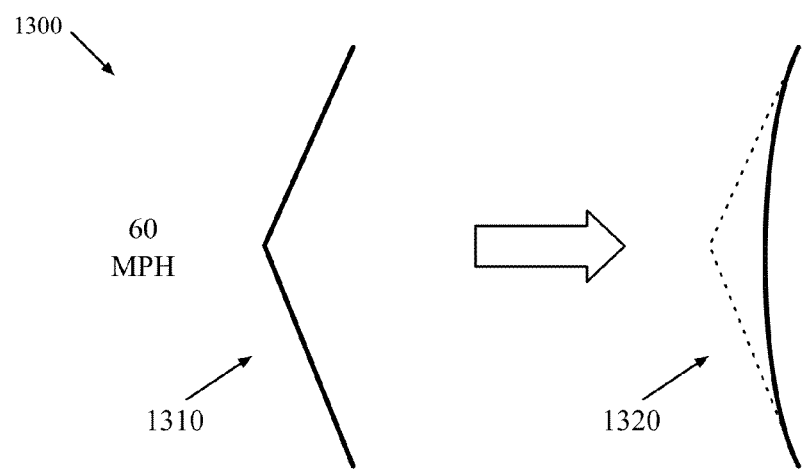

Some embodiments allow more smoothing for faster roads, because of the expectation that these roads (e.g., freeways) will be smoother and less likely to have sharp angles. Some embodiments use the speed limit data to control the smoothing. For example, some embodiments allow different deviations of the centerline from the received vertex data for roads with different speed limits (e.g., allowing up to a 5 meter deviation for speed limit 65 roads, and a 2 meter deviation for 30 mph roads). FIG. 12 illustrates a kinked road 1210 that has a speed limit of 25 mph. The result of applying the smoothing operation to the road is illustrated as modified road 1220. FIG. 13, on the other hand, illustrates a similarly kinked road 1310 with a speed limit of 60 mph. The result of applying a similar smoothing operation to the road is illustrated as modified road 1320. As shown, the modified road 1320 illustrates a greater level of curve smoothing because the speed limit of the road is larger. Some embodiments use other properties to modify the level of smoothing allowed, such as road types (which can serve as a proxy for speed limit).

In addition, some embodiments limit smoothing in special cases. For instance, a road might make a 90° turn (e.g., where two roads both end at a junction in a residential neighborhood, and have been joined together). In such a case, rather than smoothing the road too much, some embodiments fix two points close to the junction (one on either side of the 90° turn) and smooth a small elbow between these two points.

B. Server Side Generation of Intersection Data

Having described the generation of a road graph using junction and road segment data received from a map vendor, the generation of intersection data using the junction data referred to above will now be discussed. When requesting a route, the client mapping application in some embodiments receives data about each of the intersections that the route traverses, that indicates the different branches of the intersection and notes through which branches the route enters and exits the intersection. In some embodiments, this intersection information is stored by a mapping service that the mapping application accesses in order to retrieve map data as well as route and navigation information.

As mentioned above, the mapping service of some embodiments receives data specifying each junction of road segments. In some embodiments, the mapping service automatically generates additional data for each of these junctions stored in the map data, and in some embodiments converts the junction data into intersection data. This junction information simplifies each received junction (or a set of related junctions that are viewed in the real world as a single intersection) into a set of branches leaving the junction at different angles. When a user requests a route through a mapping application operating on a device, the device sends the request to the mapping service, which generates a route from a starting location to an ending location. The mapping service also generates turn-by-turn navigation instructions for the route in some embodiments, using the intersection data. The mapping service identifies the intersections at which maneuvers are made, and modifies the intersection data to be specific to the maneuver made during the route. This data is then sent to the user device on which the client mapping application runs. The following subsections first introduce the creation of navigation data for a route, then discuss the precalculation of intersection data by the mapping service (so that the data is available for use in generating navigation data), and then finally describe specific types of modifications made to the intersection data for a requested route.

1. Navigation Data Creation

Figure 14:
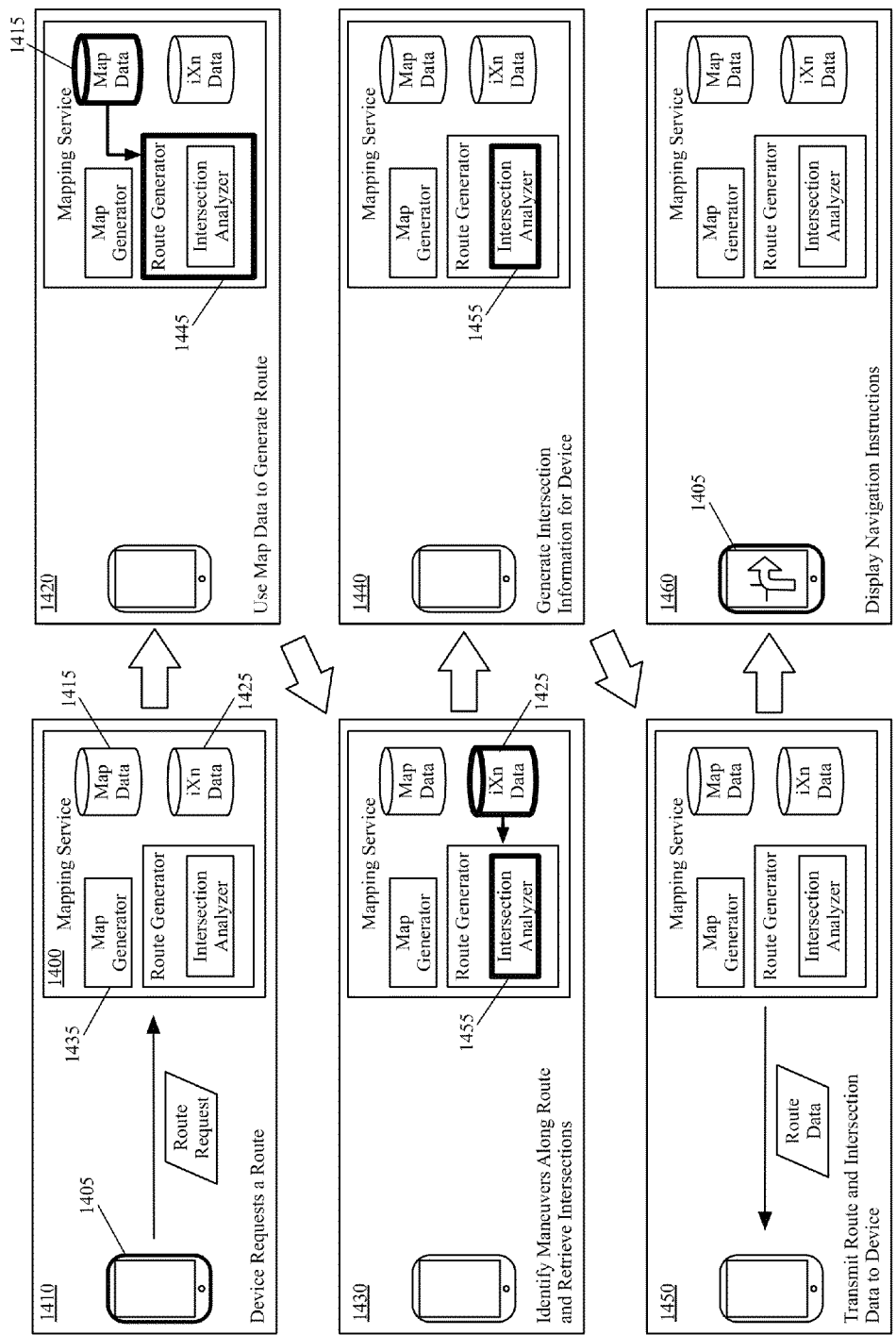
FIG. 14 conceptually illustrates an operation performed by a mapping service of some embodiments to generate a route for a requesting device and provide the route, with navigation instructions, to the requesting device.

FIG. 14 conceptually illustrates an operation performed by a mapping service of some embodiments to generate a route for a requesting device and provide the route, with navigation instructions, to the requesting device. FIG. 14 illustrates this operation over six stages 1410-1460, in which the mapping service receives a request for the route, generates the route, generates intersection data for the route, and provides the route to the device, which uses the information to display navigation instructions.

As shown, each stage of FIG. 14 illustrates a device 1405 and a mapping service 1400. The device 1405 may be a handheld device in some embodiments (e.g., a smart phone, tablet device, etc.), or may be a dedicated navigation device (e.g., a navigation system built into an automobile, a portable navigation device, etc.). In addition, in some embodiments, the device 1405 may be a non-portable device such as a desktop computer or other non-portable computing device.

The mapping service 1400 is a service to which the device 1405 connects (e.g., via a wired connection, wireless connection such as a cell network, Wi-Fi, etc.) in order to request and receive map data, route data, turn-by-turn navigation data, as well as additional information (e.g., information about places located on the map, etc.). As shown, the mapping service 1400 stores map data 1415 and intersection data 1425, and includes a map generator 1435 and route generator 1445, among other modules (not shown).

The map data 1415 provides data from which viewable map regions and routes can be generated. This map data, in some embodiments, includes latitude and longitude data, name data, as well as descriptive data about roads and other pathways (e.g., walkways, ferry routes, bike paths, etc.), natural features (e.g., rivers, lakes, mountain ranges, etc.), places of interest (e.g., buildings, businesses, parks, etc.), and other map items. In some embodiments, for example, a pathway is defined as a series of latitude/longitude vertices, a name, and descriptive data. This descriptive data may include a form of way (i.e., whether the pathway is a single carriageway or a part of a dual carriageway, whether the pathway is a one-way path), the class of road to which the path belongs (e.g., motorway, local road, private road, bicycle path, etc.), as well as other information). In some embodiments, this map data is compiled by an outside source (i.e., a map provider) and provided to the mapping service, while in other embodiments the mapping service provides its own map data. The map data may also be a hybrid of outsider-provided and internally-generated data. In addition, the map data may include geometry data for various map constructs, such as roads, land cover, etc.

The intersection data 1425 provides pretabulated data for the intersections of road paths in the map data. In some embodiments, as described below, the mapping service automatedly calculates intersection data for road pathway intersections using the map data. This intersection data 1425 may be stored by denoting an intersection type (e.g., point, roundabout) and a series of branches coming in and out of the intersection at different angles. While the map data 1415 and the intersection data 1425 are shown as separate storages, these may both be stored on the same physical storage or on separate physical storages, and the intersection data 1425 may in fact be part of the map data 1415. In addition, one or both of the map and intersection data might be distributed across several physical storages (e.g., a series of disks for storing the map data).

The map generator 1435 of some embodiments generates map information (e.g., map tiles) to transmit to the requestor device. The requestor device requests a map for a particular region (e.g., using latitude/longitude information), and the map generator 1435 creates (or uses pre-generated) map tiles for the region, then sends data for these tiles (e.g., as encoded vector and/or image data) to the device.

The route generator 1445 calculates optimal routes between two or more points in response to user requests. In some embodiments, the route generator 1445 calculates the routes based on the map data, using optimization algorithms. The routes may be defined as a series of intersections, a series of road pathways, or in other manners. In addition, when a user requests a route, the route generator 1445 provides intersection data for use by the device in turn-by-turn navigation. In some embodiments, the intersection analyzer 1455 retrieves intersection data 1425, and modifies this data for navigation of the route, as described below.

As shown, at stage 1410, the device 1405 sends a request for a route to the mapping service 1400. In some embodiments, the user enters a starting address (or place) and an ending address (or place), potentially including additional midpoint locations (e.g., starting at A, going to B, then going to C from B). The device then transmits location information to the mapping service. In some embodiments, the device translates the locations into latitude and longitude data, while in other embodiments this conversion is performed by the mapping service.

At stage 1420, the route generator 1445 accesses the map data 1415 in order to generate one or more routes for the series of locations. In some embodiments, the route generator 1445 uses an optimization algorithm to find the best (and second best, third best, etc.) route that connects the series of locations.

At stage 1430, the intersection analyzer 1455 identifies maneuvers along the route for which navigation directions need to be generated and retrieves intersection information for these maneuvers. Some embodiments generate turn-by-turn navigation directions to provide to the device along with the route. To generate these directions, the mapping service 1400 identifies each time the route changes pathways, at which point the user following the directions will have to perform a maneuver (e.g., right turn, slight left turn, U-turn, merge, etc.). In some embodiments, each of these pathway changes corresponds to a pretabulated intersection stored in the intersection data 1425. The intersection analyzer 1455 retrieves this intersection data. In some embodiments, each intersection is stored as a series of branches coming out of the intersection at various angles (e.g., based off of North=0°). In some embodiments, in addition to the intersection data, the route generator creates routing directions, that generally describe the maneuver to be performed. Examples of such descriptions include "turn left", "highway off ramp", "U-turn", etc. In other embodiments, this description is derived by the client mapping application based on the received intersection data.

Next, at stage 1440, the intersection analyzer 1455 generates intersection information designed for the route. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, the intersection analyzer 1455 tags one of the branches as the exit branch. Some embodiments tag an entrance branch as well, while other embodiments rely on the device to identify the 180° branch as the entrance branch.

Stage 1450 illustrates that the mapping service 1400 then transmits (e.g., via the same network that the device used to transmit the route request) the route data (i.e., route data and intersection data for navigation) to the device 1405. As shown at stage 1460, the device 1405 then uses the intersection and route data generated by the mapping service to display navigation instructions for the user of the device. In some embodiments, the navigation instructions include a display of the intersection along with a stylized arrow showing the maneuver (in this case, a right turn) through the intersection.

While the mapping service 1400 is displayed as including a map generator module and a route generator module, one of ordinary skill in the art will recognize that the mapping service may include additional modules, or different breakdowns of modules. The mapping service may consist of a single computing device (e.g., a server) storing all of the functionality and data, or the functionality may be distributed between multiple servers (e.g., one process on a first server and a second process on a second server, numerous servers that perform the same operation in parallel for different users, or other configurations of computing devices that perform the functionality described herein).

Figure 15:
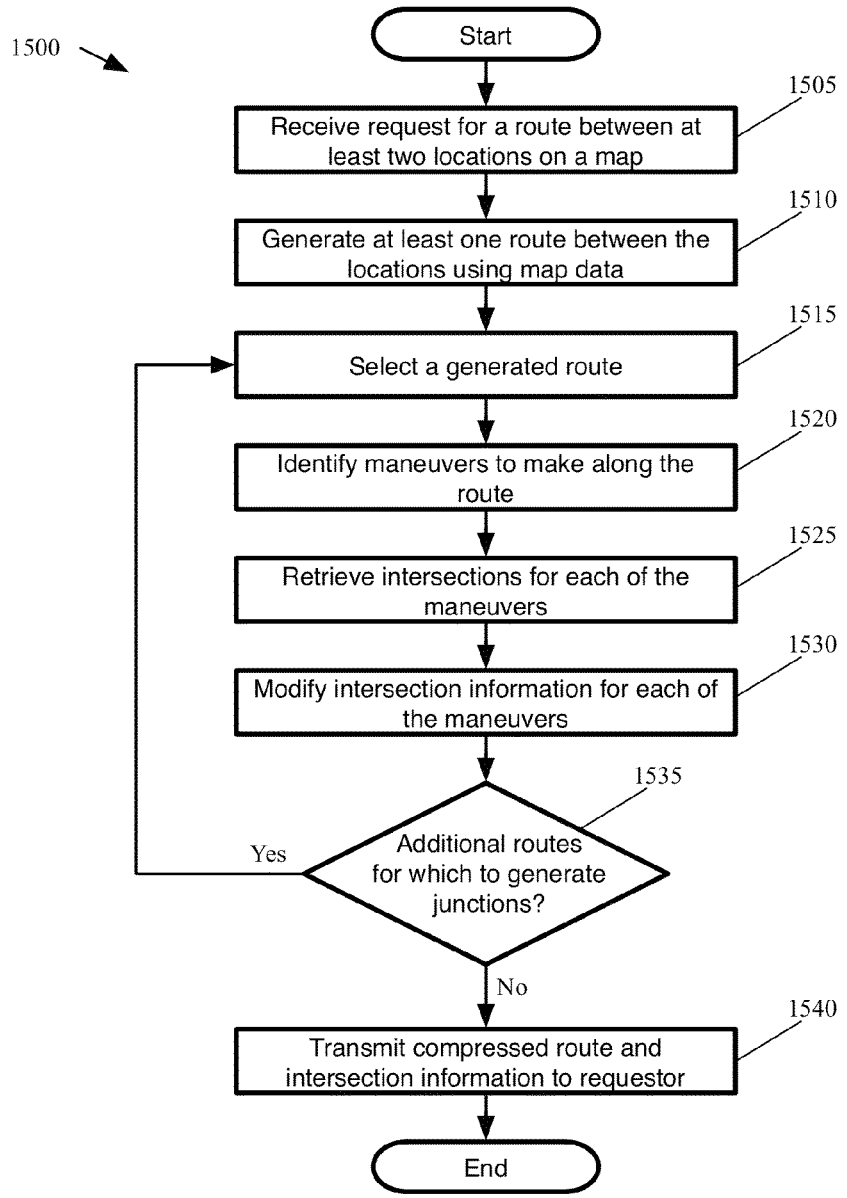
FIG. 15 conceptually illustrates a process performed by the mapping service of some embodiments in order to generate and transmit route and intersection data to a user.

FIG. 15 conceptually illustrates a process 1500 performed by the mapping service of some embodiments in order to generate and transmit route and intersection data to a user. As shown, the process 1500 begins by receiving (at 1505) a request for a route between two locations on a map. In some embodiments, when the user requests a series of more than two locations, each segment is treated as a separate route (i.e., from point A to point B is a first route, then point B to point C is a second route).

The process then generates (at 1510) at least one route between the locations using map data. In some embodiments, the process uses an optimization algorithm to identify the best (or two best, three best, etc.) routes between the two locations. These routes may be described as a series of vertices along pathways, a series of intersections between pathways, or with another description.

With the routes generated for the start and end locations, process 1500 selects (at 1515) one of the generated routes in order to create turn-by-turn instructions for the route. The process then identifies (at 1520) maneuvers to make along the route. In some embodiments, the mapping service identifies each time the route changes pathways, at which point the user following the directions will have to perform a maneuver (e.g., right turn, slight left turn, U-turn, merge, etc.).

Next, the process retrieves (at 1525) intersections for each of the maneuvers. In some embodiments, each of these pathway changes corresponds to a pretabulated intersection stored by the mapping service. The generation of these intersections is described in detail below. In some embodiments, each intersection is stored as a series of branches coming out of the intersection at various angles (e.g., based off of North=0°). In addition, the intersection data stores the type of intersection in some embodiments (e.g., point, roundabout, traffic square, etc.).

The process then modifies (at 1530) the intersection information for each of the maneuvers. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, some embodiments tag one of the branches as the exit branch. Some embodiments tag an entrance branch as well, while other embodiments rely on the device to identify the 180° branch as the entrance branch.

The process 1500 next determines (at 1535) whether additional routes remain for which to generate maneuver/intersection information. When additional routes remain, the process returns to 1515 to select the next route. Different variations of routes from a start location to an end location may overlap in part, in which case some embodiments reuse the already-generated set of intersections for the overlapping portions.

Once intersections are generated for all of the routes, the process transmits (at 1540) the route and intersection information to the requestor (e.g., a requesting device). As mentioned, the requesting device uses this information in some embodiments in order to generate turn-by-turn navigation, including stylized junction/maneuver arrows.

2. Precalculation of Intersection Data

As mentioned above, some embodiments precalculate intersection data from the stored map data (e.g., road segment and junction data). The mapping service then stores this intersection data for use in generating turn-by-turn navigation instructions. The following subsection describes several processes used to generate this intersection data, in which the mapping service receives vendor-provided junctions, identifies whether any sets of the received junctions should be consolidated into a single intersection, identifies pairs of road segments that should be joined together within an intersection, and generates angles for the intersection. Within this section, the term junction will be generally used to refer to vendor-provided information at which two path segments intersect, while the term intersection will refer to data generated from the junctions that represents where two or more roads meet in the real world. Thus, multiple junctions might be consolidated into one intersection, and junctions between two road segments that are actually just a continuation of a single road might not be considered intersections at all, in some embodiments.

The following represents pseudocode of some embodiments for generating intersection data for point intersections:
Identify all internal segments;
Identify all internal turn channels and mark them as internal segments;
For each internal segment:
  Gather all contiguous internal segments;
  Mark the gathered internal segments as processed;
    Build an intersection from this collection of internal segments;

In addition to other data (e.g., locations of parks, waterways, businesses, etc.), the map data stores information about pathways (i.e., roads, walkways, bike paths, etc.). Each pathway, in some embodiments, is received from a map provider as a series of segments (e.g., road segments). For a given segment, in some embodiments the stored data includes start and end junctions for the segment, geometry data that defines the course taken by the path between the start and end junctions, a path characterization (or "form of way"), a direction of travel (which may, in some embodiments, involve a one-way flag), one or more names for the path (e.g., "I-405 S", "San Diego Freeway", etc.), a class that indicates the level of importance of the path, and a netclass (a connected graph of paths to which the path belongs). In some embodiments, the geometry information comprises a series of latitude/longitude vertices through which the path travels. The form of way attribute, in some embodiments, includes the following characterizations: single carriageway, dual carriageway, motorway, slip road, connector, walkway, stairs. Some embodiments may include additional characterizations.

Figure 16:
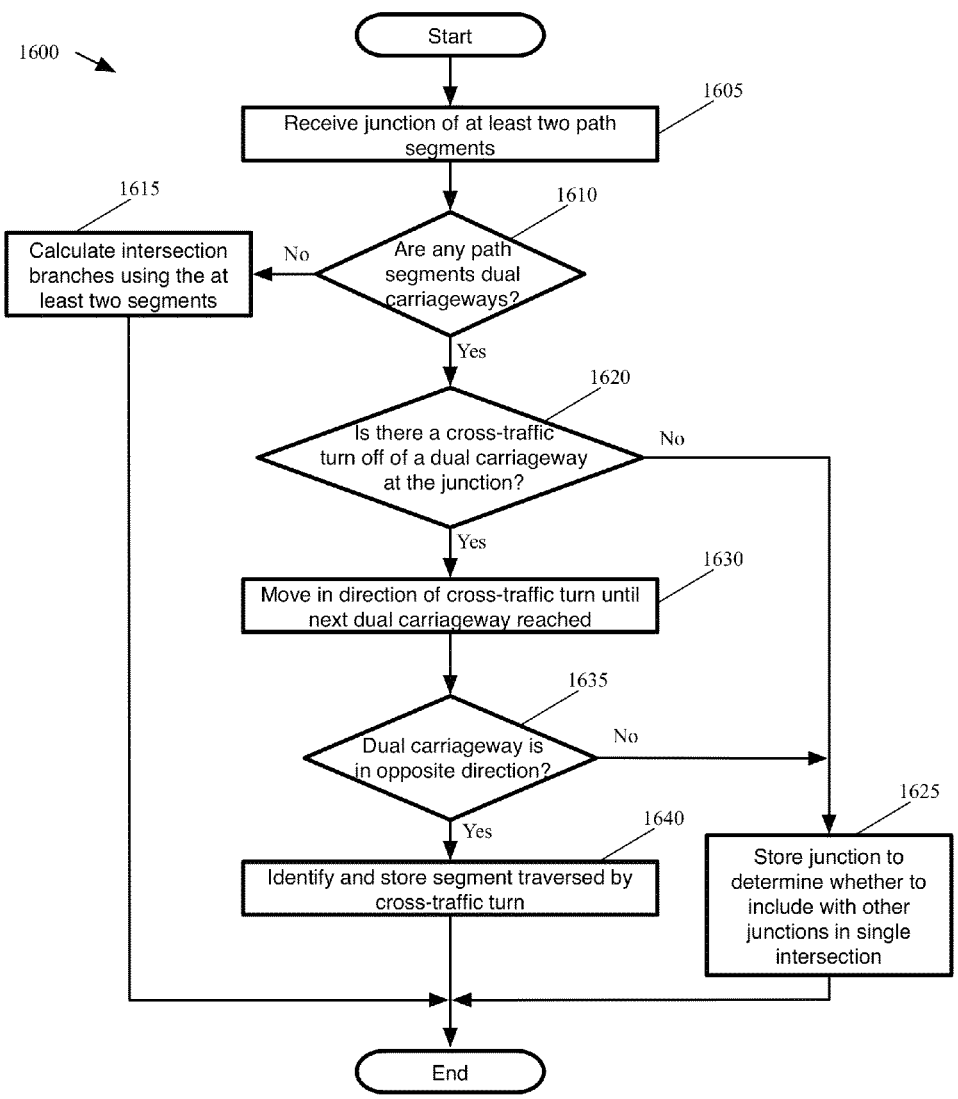
FIG. 16 conceptually illustrates a process of some embodiments for determining path segments between sets of junctions that should be treated together as single intersections.

FIG. 16 conceptually illustrates a process 1600 of some embodiments for determining path segments between sets of junctions that should be treated together as a single intersection. As shown, the process 1600 begins by receiving (at 1605) a junction between at least two path segments (e.g., road segments). In some embodiments, the mapping service receives (e.g., as precalculated data from a map vendor) a set of road segments and a set of junctions. Each road segment follows a path between two such junctions, and each junction references at least two road segments that enter and/or exit the junction. On the other hand, in some embodiments, the junctions are not received from the map data vendors and the mapping service traverses the path data to identify intersections between paths and analyzes these intersections in order to pretabulate the junctions.

The process then determines (at 1610) whether any of the path segments at the received junction are dual carriageways. As mentioned, a dual carriageway is a path characterization used in some forms of map data. Many roads that are divided (e.g., by a median, a double-yellow line, etc.) are received (and drawn) as two separate path segments, one for each direction. Each of the path segments is then marked with a direction of travel and as one-half of a dual carriageway. Because a user will typically think of an intersection of two roads that are both divided by medians as a single intersection (rather than four separate intersections), the junction generation process attempts to unify these four received junctions into a single intersection to present to a user for navigation purposes.

Figure 17:
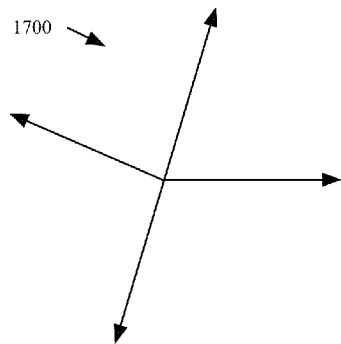
FIG. 17 illustrates an example of a junction of some embodiments and shows that there is no requirement that the path segments meet at right angles or that the paths continue in a straight line through the junction.

When none of the path segments are marked as dual carriageways, the process calculates (at 1615) the intersection branches using only the path segments specified in the received junction (i.e., the intersection will include only the one received junction). In some embodiments, the calculation of junction branches entails calculating the angle at which each of the segments specified for the junction leaves the junction location. The process then ends. FIG. 17 illustrates an example of such a junction 1700, also illustrating that there is no requirement that the path segments meet at right angles or that the paths continue in a straight line through the junction.

Figure 18:
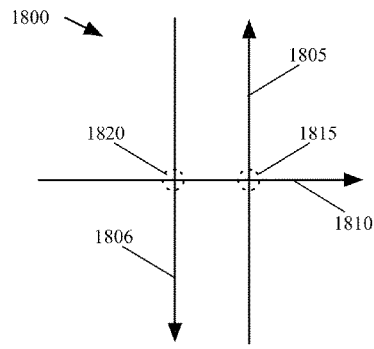
FIG. 18 illustrates an intersection of some embodiments that includes two dual carriageway paths and a one-way road.

When at least one path segment specified for the received junction is a dual carriageway, the process determines (at 1620) whether there exists a cross-traffic turn off of a dual carriageway at the junction. A cross-traffic turn is a turn off of the dual carriageway in a direction that will cross through the matching half of the dual carriageway (i.e., the other direction of the road), assuming it exists. In the United States, a left turn is a cross-traffic turn. While the examples shown in this document involve right-handed driving (i.e., driving on the right side of the road), one of ordinary skill will recognize that the examples are equally applicable to left-handed driving areas (e.g., England) as well. FIG. 18 illustrates an intersection 1800 that includes two dual carriageway paths 1805 and 1806 and a one-way road 1810. At the junction 1815, there is no cross-traffic turn off of a dual carriageway, because the only options are a right turn off of the dual carriageway path 1805 or a left turn off of the one-way street 1810. When no such turn exists, the process 1600 stores (at 1625) the received junction while recognizing that it may still be part of a larger intersection, in order to determine whether to include the received junction with other received junctions (e.g., the junction 1820 between the one-way road 1810 and the dual carriageway path 1806) in a larger intersection. For instance, in the intersection 1800, the process will want to join the received junction 1820 with the received junction 1815 into a single larger intersection. The process then ends.

When a cross-traffic turn off of a dual carriageway exists at the junction (for instance, at junction 1820), the process moves (at 1630) in the direction of the cross-traffic turn until the next dual carriageway path is reached. In some embodiments, because the path segments start and stop at junctions, the next dual carriageway path will be reached at a different received junction (though not necessarily the next junction, if a road such as a left turn lane is received as a separate path segment). For instance, from intersection 1820, the process would traverse the path 1810 away from the junction 1820 until reaching the next dual carriageway, at junction 1815.

The process 1600 then determines (at 1635) whether the dual carriageway path reached at 1630 has a direction of travel in the opposite direction of the originating dual carriageway path. This, essentially, is a quick determinant of whether the second dual carriageway could be the matching path for the first dual carriageway (i.e., whether they are likely to be two sides of the same road). In most cases, this next dual carriageway will be the matching path, due to the nature of how roads are typically built.

In the case when the second dual carriageway is not in the opposite direction of the originating path, the process proceeds to 1625 to store the newly reached junction for later use in determining whether to include it with any other received junctions. For example, if the left turn off of path 1806 reached another dual carriageway with a downward direction of travel, then path 1806 could be assumed to not have a match in the data (as far as the junctions are concerned, at least), but the newly identified path might itself have a match.

On the other hand, if the two dual carriageways have opposite directions of travel, the process identifies and stores (at 1640) the segment traversed by the cross-traffic turn. In the example of FIG. 18, the segment from junction 1820 to junction 1815 would be stored. This segment will be used as part of additional junction consolidation processes in some embodiments. The process then ends.

Figure 20:
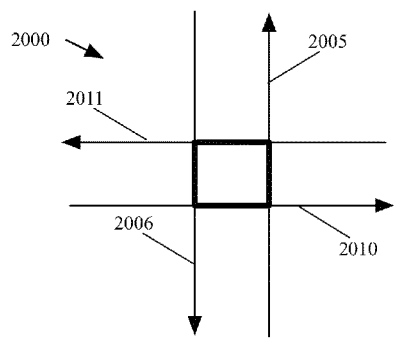
FIG. 20 illustrates a commonly existing intersection of some embodiments, between a dual carriageway with two paths and a dual carriageway with two paths.
Figure 19:
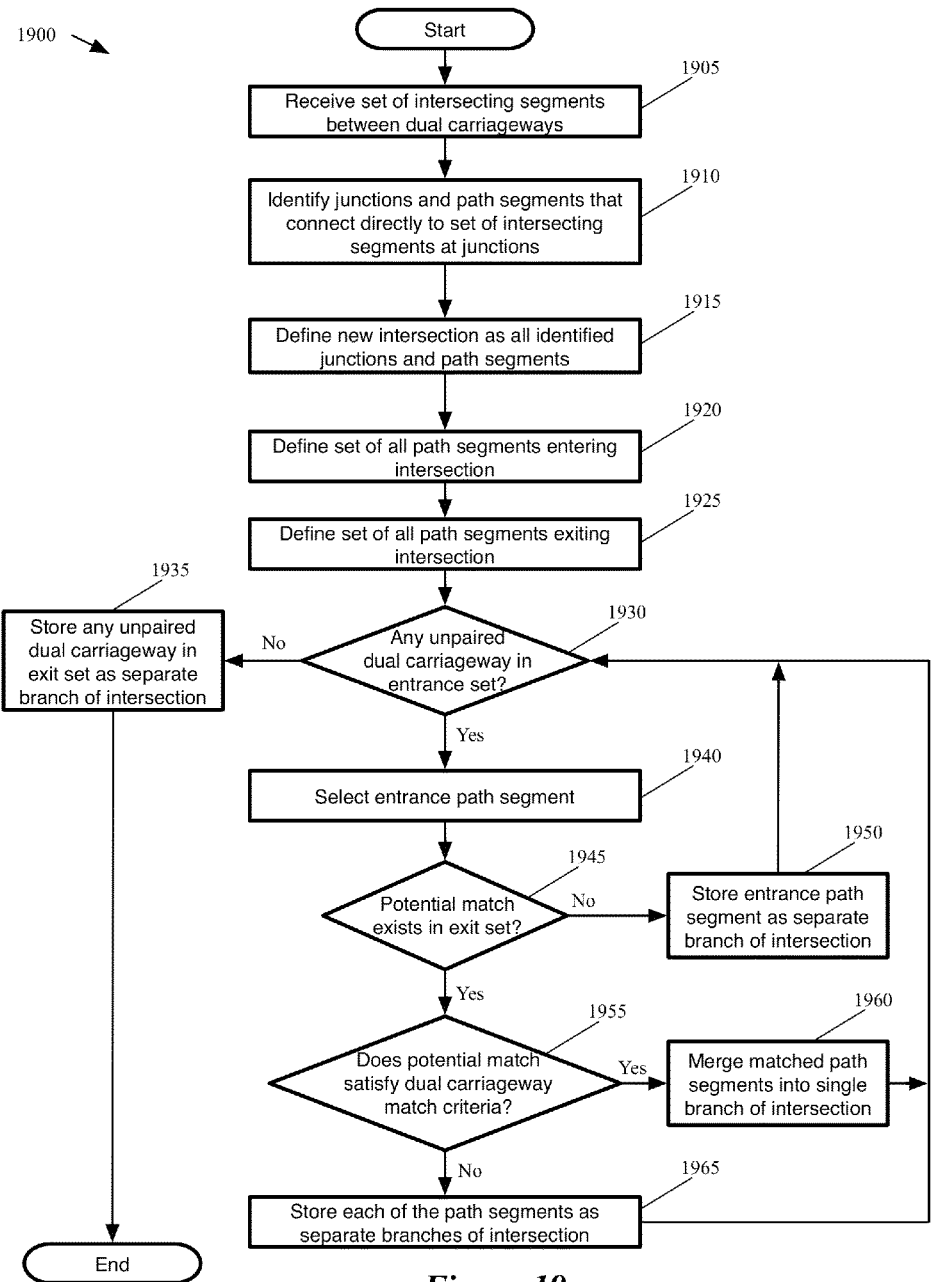
FIG. 19 conceptually illustrates a process of some embodiments for linking together several junctions into a single intersection and identifying the branches of the intersection.

The above process 1600, when applied to all the junctions within a map region, will generate a set of segments between dual carriageways. Some embodiments use these segments to link together received junctions and identify additional received junctions to include in a single intersection definition. The following represents pseudocode of some embodiments for identifying all such "internal" segments for a complex intersection:

For each segment that is a dual carriageway;
        For each connection with cross-traffic turn where a path can be assembled to other side of intersection;
            Mark all segments on the path to other side as internal segments;

This pseudocode includes a determination as to whether a path can be assembled to the other side of an intersection from a segment. The following includes pseudocode of some embodiments for such a determination:

Add first segment to path;
    Get connections from last segment on path;
    Iterate through each connection to either find a connection to other side or find connection that is best continuation;
        If connection is other side, note success and end;
        If no connection is other side and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

FIG. 19 conceptually illustrates a process 1900 for linking together several junctions into a single intersection and identifying the branches of the intersection. The process 1900 begins by receiving (at 1905) a set of intersecting segments between dual carriageways. These segments may be identified using a process such as that shown in FIG. 16, in some embodiments. The mapping service then groups together sets of such segments that intersect each other (i.e., at received junctions). FIG. 20 illustrates a commonly existing intersection 2000, between a dual carriageway with paths 2005 and 2006 and a dual carriageway with paths 2010 and 2011. The set of intersecting segments are shown in this figure as thicker lines.

The process then identifies (at 1910) all junctions and path segments that connect directly to the set of intersecting segments at junctions. That is, the set of intersecting paths intersect at junctions, but these junctions may contain additional path segments. For instance, in the example intersection 2000, the eight dual carriageway path segments that leave the intersection all intersect with the internal (thicker) path segments at the four junctions. Thus, the four junctions and eight external path segments are all included in the intersection.

Figure 21:
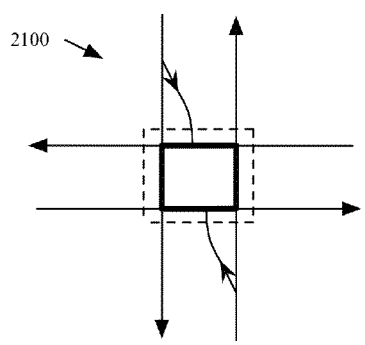
FIG. 21 illustrates an intersection of some embodiments in which left-turn channels are defined as separate path segments.

FIG. 21, on the other hand, illustrates an intersection 2100 in which left-turn channels are defined as separate path segments. In this case, because the left-turn channels intersect the internal segments at junctions received in the initial map data, these channels are identified by the process 1900. The left-turn channels may be characterized in the map data as slip roads or single carriageways, in most cases.

The following represents pseudocode of some embodiments for identifying all turn channels to treat as "internal" to an intersection:

For each segment that is a dual carriageway;
        For each connection with cross-traffic turn where a path can be assembled to internal segments;
            Mark all segments on the path to the internal segments as internal segments themselves;

This pseudocode includes a determination as to whether a path can be assembled to the internal segments from a segment (e.g., a turn channel). The following includes pseudocode of some embodiments for such a determination:

Add first segment to path;
    Get connections from last segment on path (i.e., segments connected to last segment at junction);
    Iterate through each connection to either find either an internal segment or find connection that is best continuation;
        If connection is an internal segment, note success and end;
        If no connection is internal segment and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

Next, the process 1900 defines (at 1915) a new intersection as including all of the identified junctions and path segments, including those that directly intersect the initial set of path segments. In some embodiments, in the case illustrated in FIG. 21, the junctions where the left-turn channels leave their originating dual carriageway segments would be included as well as the left-turn channels that intersect the initial segments. In this situation, some embodiments identify the other junction (i.e., the start junction) for the slip road or single carriageway path segment, which will be where the path segment intersects with one of the dual carriageway path segments before entering the intersection. When the single carriageway path segment stays internal to a (presumed) pair of dual carriageway paths for a threshold distance (e.g., 1 km), some embodiments assume the path segment is a part of the road defined by the dual carriageway paths, and eliminate the junction from consideration.

Figure 22:
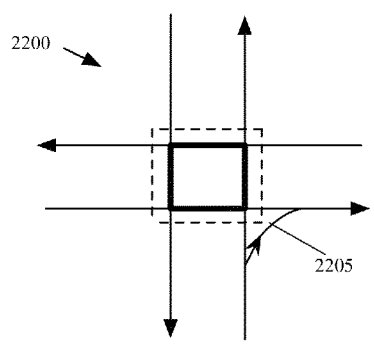
FIG. 22 illustrates a slip road in an intersection of some embodiments.
Figure 23:
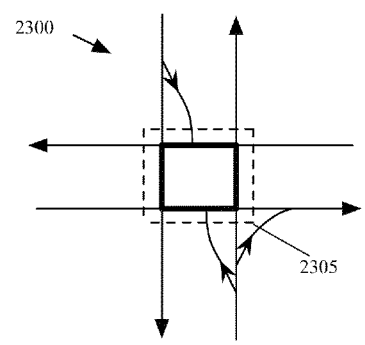
FIG. 23 illustrates an intersection of some embodiments with both a slip road and left-turn channels.

When processing a slip road or other connector outside of the dual carriageways (e.g., the slip road 2205 shown in the intersection 2200 of FIG. 22), some embodiments do not treat the slip road as a path into the dual carriageway intersection. Instead, some embodiments identify the path characterization as a slip road and attempt to form a closed loop including the start and end junctions of the slip road. When this closed loop shares a common junction with the newly defined intersection (as will typically be the case), the slip road may be associated with the intersection but not treated as an internal path of this intersection. On the other hand, when the newly defined dual carriageway intersection has grown due to the presence of, e.g., left-turn channels, such that the slip road junctions are encompassed by the intersection now including the intersecting single carriageways (as for the slip road 2305 in the intersection 2300 of FIG. 23), some embodiments treat the slip road as internal to the newly defined intersection. In the description of the intersection, these left turn channels, slip roads, etc., will typically be eliminated, as a user generally will not want complex instructions, but will instead want an instruction of "make a right turn onto San Vicente Blvd" or something similar.

Figure 24:
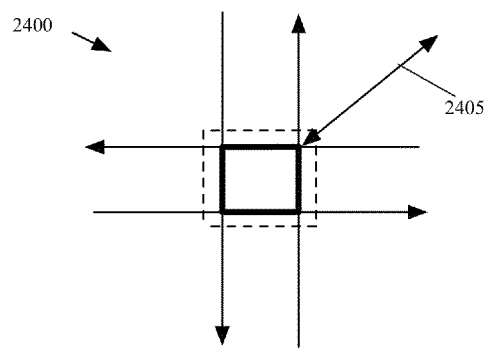
FIG. 24 illustrates an additional two-way path in an intersection in some embodiments.

With the set of segments and junctions that form the intersection defined, the process needs to merge dual carriageways into single junction branches. The process 1900 next defines (at 1920) the set of all paths entering the intersection, and defines (at 1925) the set of all paths exiting the intersection. For a dual carriageway, which is a one-way path (half of a two-way road), the path will typically have an exit side and an entrance side. For purposes of merging, some embodiments treat each segment (the segment exiting the intersection and the segment entering the intersection) as separate paths. Single carriageways that are not internal to dual carriageways (e.g., the additional two-way path 2405 in the intersection 2400 of FIG. 24) will typically be treated as separate branches and are not part of the merging analysis in some embodiments.

Next, the process determines (at 1930) whether the set of entrance paths includes any unpaired dual carriageway paths. When no such paths remain in the set (or none existed in the first place), the process stores (at 1935) any unpaired dual carriageway left in the set of exit paths as separate branches of the junction. In general, this will happen in the case of mislabeled map data (the road is actually a one-way street) or merging criteria that are too strict (leaving a pair of entrance and exit paths unmerged).

When an unpaired entrance path exists, the process selects (at 1940) one of the entrance paths. The process then determines (at 1945) whether a potential match exists in the exit set. A potential match, in some embodiments, is a dual carriageway found by traversing the previously identified segment to the left (to the right, in the case of left-handed driving regions), or traversing the intersection in a clockwise fashion.

When no potential match exists (e.g., the next identified dual carriageway in the traversal is also an entrance path, or the exit set is empty), the process stores (at 1950) the entrance path as a separate branch of the intersection and then returns to 1930 to find the next unpaired entrance path. On the other hand, when a potential match exists, some embodiments determine (at 1955) whether the potential pair satisfies a set of dual carriageway match criteria. These are criteria, in some embodiments, to determine whether a pair of dual carriageways are actually the two sides of the same road. Some embodiments determine whether the two paths (1) are within a threshold distance (e.g., 25 m, 50 m, etc.) where the paths enter/exit the intersection, and (2) whether the angles at which the paths hit their junctions within the intersection is within a threshold range of each other (e.g., 5°, 10°, etc.). To calculate the angle, some embodiments use the vertex closest to the edge of the intersection (or the location of the junction at which the path segment intersects the other segments within the intersection) and a vertex located a particular predefined distance (e.g., 50 m) away. The process then calculates the angle off of North for the line between the two vertices.

In some embodiments, the mapping service additionally looks at the names of the paths to determine whether these match. When the names match, such embodiments may relax the geometry criteria for a matching pair (i.e., allow a greater distance between the paths or a greater difference in angles between the paths). Matching names might be, e.g., "CA-1 South" and "CA-1 North", or if both paths include "Wilshire Blvd." as one of their names. Some embodiments may also look at the road class data for confidence in matching dual carriageways.

Figure 25:
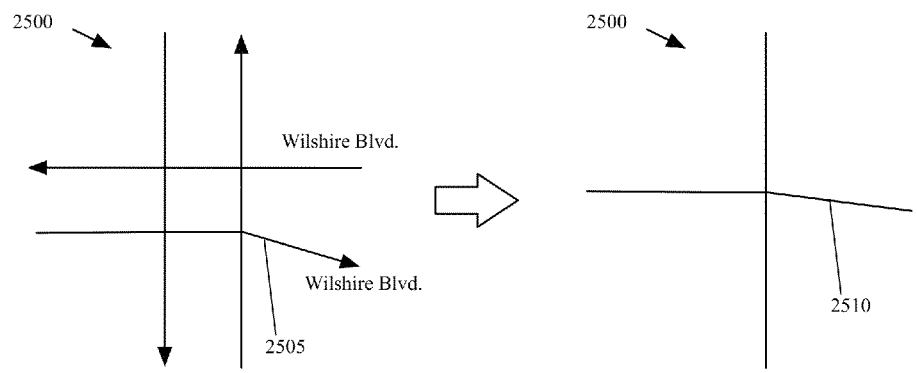
FIG. 25 illustrates the reduction of an eight-path intersection into four branches in some embodiments.

If the two paths match, the process merges (at 1960) the paths into a single branch of the newly defined intersection. As indicated above, intersections are stored as a set of branches at different angles. For a merged path, some embodiments store the angle as the average of the angles of the two paths that make up the branch. FIG. 25 illustrates the reduction of an eight-path intersection 2500 into four branches, in which the angle of the right branch 2510 is at half the offset from horizontal as the right exit path 2505, because the right entrance path is on the horizontal. As shown conceptually, directions (entrance/exit) are not stored for intersection branches in some embodiments. The mapping service generates the routes using map data, which includes the intersections as well as directions of travel for the roads, so a route will not travel the wrong way on a branch of the intersection.

Figure 26:
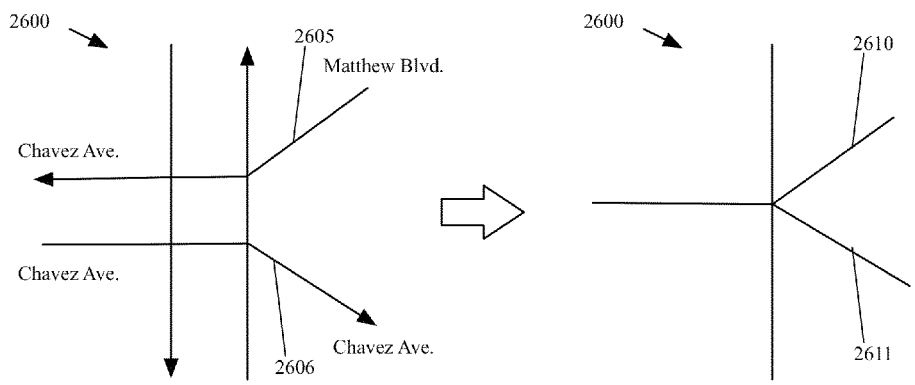
FIG. 26 illustrates the reduction of a different eight-path intersection into five branches in some embodiments.

On the other hand, when the paths do not match, the process stores (at 1965) each of the paths as separate branches of the intersection. FIG. 26 illustrates the reduction of a different eight-path intersection 2600 into five branches. In this case, the dual carriageway paths 2605 and 2606 on the right side do not merge and are therefore treated as separate branches 2610 and 2611 of the reduced intersection. In this example, the angle at which each of these branches leaves the intersection is the angle that is stored for the branch (with no averaging). The process 1900 then returns to 1930 to determine whether any entrance paths remain. As stated, once the entrance path set is empty, the process proceeds to 1935, and subsequently ends.

Figure 27:
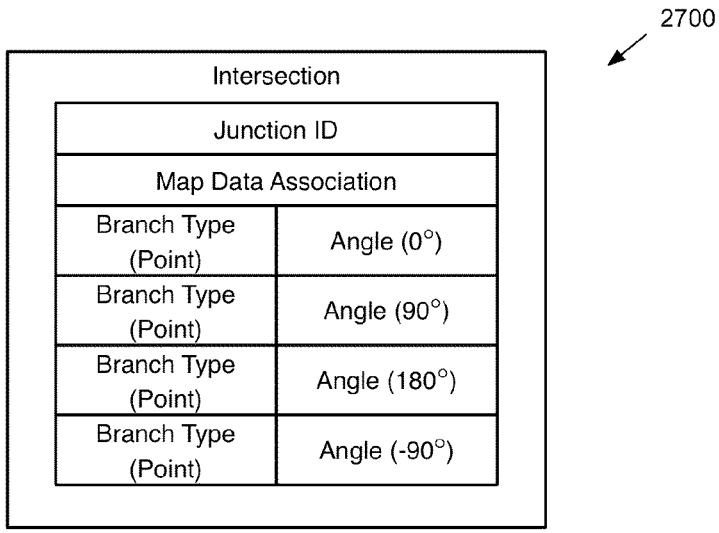
FIG. 27 conceptually illustrates an example of a data structure of some embodiments for a point type intersection.

The following represents pseudocode of some embodiments for generating the data for an intersection once the internal segments have been identified for the intersection (e.g., operations performed by some or all of process 1900):

Gather all external segments that touch internal segments for an intersection;
Identify external segments that are surrounded by internal segments in the intersection and mark them as internal;
Group together pairs of incoming and outgoing segments that represent same road;
Compute an outgoing angle for each pair and for each unpaired road;
Construct a template Intersection Pattern with one branch for each angle;
If pattern exists for previously generated intersection, use existing pattern to save space (refer intersection to existing pattern);
Else if pattern does not exist, create and store new entry for pattern;

As indicated, some embodiments store each intersection as a data structure. This data structure indicates the branches of the intersection and the angles at which the branches enter and/or exit the junction. FIG. 27 conceptually illustrates an example of such a data structure 2700 of some embodiments for a point type intersection. As shown, the intersection includes an intersection ID (which, in some embodiments is a unique identifier), a map data association, and a set of branches with angles and types. The map data association, in some embodiments, associates the intersection data structure with an actual location within the map. In some embodiments, this is simply a latitude/longitude point, but may also consist of other data in other embodiments (e.g., a list of the path segments or aggregate paths that meet at the intersection). Each branch includes a type and an angle. The type, in some embodiments, is an intersection type. Some embodiments define two intersection types: point and roundabout. However, other embodiments may include additional intersection types, such as traffic squares. Some embodiments store the intersection type as a property of the intersection rather than separately for each branch, but other embodiments recognize the possibility of an intersection partially being a roundabout but partially being a point intersection. The data structure 2700 includes four branches, at the cardinal directions of 0° (North), 90° (East), 180° (South), and −90° (West). In some embodiments, the intersection data structure also includes references to any junctions (i.e., data received from the map data provider) and path segments that are contained within the defined intersection. For a typical intersection of two dual carriageways, four junctions are referred to by such a data structure.

Figure 28:
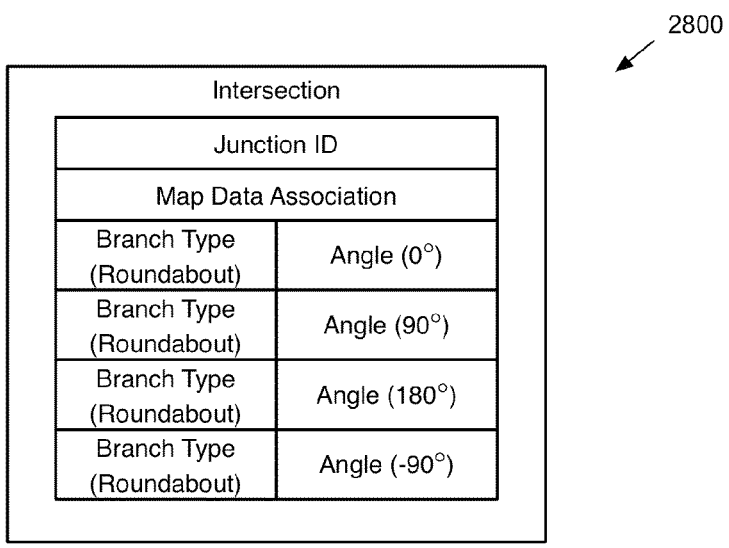
FIG. 28 conceptually illustrates a data structure of some embodiments for a roundabout intersection.

FIG. 28 illustrates a data structure 2800 of some embodiments for a roundabout intersection. Some embodiments provide specialized processing for roundabout intersection. The following represents pseudocode of some embodiments for generating intersection data for roundabout intersections:

Identify all roundabout segments;
    For each roundabout segment:
        Gather all contiguous roundabout segments;
        Mark the gathered roundabout segments as processed;
        Build a roundabout intersection from this collection of roundabout segments;

In some cases, the map data identifies a roundabout (e.g., as a form of way or through another indicator). This allows the mapping service intersection calculator to begin its specialized automated roundabout processing. Specifically, when performing roundabout processing, the mapping service attempts to identify pairs of flare connectors (i.e., the portions of a road that flare into and out of a roundabout). In some embodiments, the intersection calculator traverses the roundabout (e.g., in a counterclockwise fashion for right-handed driving) looking for an exit path that is followed, within a particular distance (e.g., angular distance), by an entrance path. The process then determines whether to combine these paths, looking at factors similar to those for merging dual carriageways at point intersections. For instance, the factors used might include whether the names are similar, whether the distance between the exit/entrance paths is small enough, and potentially other factors. As a result of this processing, when a random road intersects the roundabout in between what otherwise appears to be an entrance/exit combination, some embodiments treat this as three separate branches.

Figure 29:
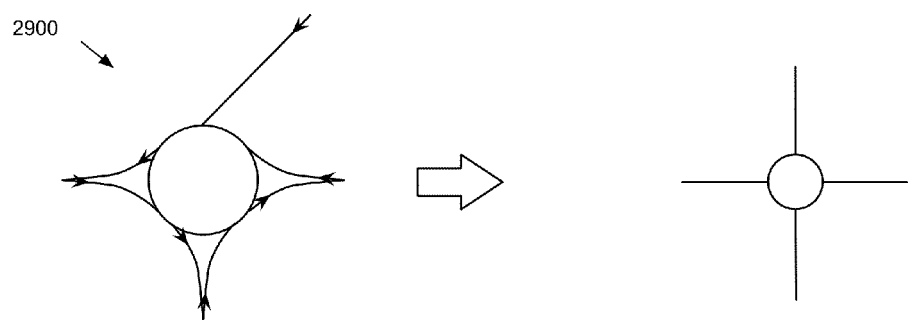
FIG. 29 conceptually illustrates the reduction of a roundabout intersection to intersection data in some embodiments.

In order to calculate the angles of the branches, some embodiments determine where the branch intersects the roundabout, rather than the angle of approach of the road. For entrance/exit combinations, the process takes the average of the two paths. FIG. 29 conceptually illustrates the reduction of a roundabout intersection 2900 to intersection data. The top path, despite approaching at approximately a 30° angle off of North, is designated as a 0° branch—the user is primarily interested in the distance around the traffic circle for the intersections, rather than the angle at which they enter and exit. The other three branches are also designated cardinal directions, because their flares average out to these directions. The data structure 2800 shows the data structure for the roundabout junction 2900. Other embodiments, however, use the angle at which the paths enter or exit the roundabout, rather than the distance around the roundabout at which the paths intersect it.

The following represents pseudocode of some embodiments for generating the data for a roundabout intersection once the roundabout segments have been identified for the intersection:

For set of roundabout segments that form a simple loop:
        Gather all non-roundabout segments that touch the loop, ordered by the direction of travel around the loop;
        Group together pairs of consecutive roundabout exit/entry segments that represent same road;
        Assign an angle to each pair and each unpaired segment;
        Subtract the smallest angle from all angles (so smallest angle=0);
        Construct a template intersection pattern with one branch for each angle;
        If pattern exists for previously generated intersection, use existing pattern to save space (refer intersection to existing pattern);
        Else if pattern does not exist, create and store new entry for pattern;

As indicated in the above examples of pseudocode, some embodiments perform additional compression when storing the intersections. The real world contains millions (or hundreds of millions) of individual intersections, but many of these intersections have the same configuration (especially when very small angular variations are tolerated). Thus, rather than storing separate data for each of the hundreds of millions of intersections, some embodiments utilize compression in storing the intersections. As each intersection is processed, some embodiments store a template pattern for that intersection. When additional intersections with the template pattern are identified, such embodiments store a reference to that pattern (while still creating a separate data structure, as the location information is different for two intersections that follow the same pattern).

3. Modification of Junction Data for Navigation

The above subsection described the generation of complex intersection data, typically done as an offline process prior to route generation. However, at the time of route generation, some embodiments modify the intersection data for transmission to the user. The mapping service providing the route data modifies the angles to make them relative to the direction of entry and marks one of the branches as an exit branch.

Figure 30:
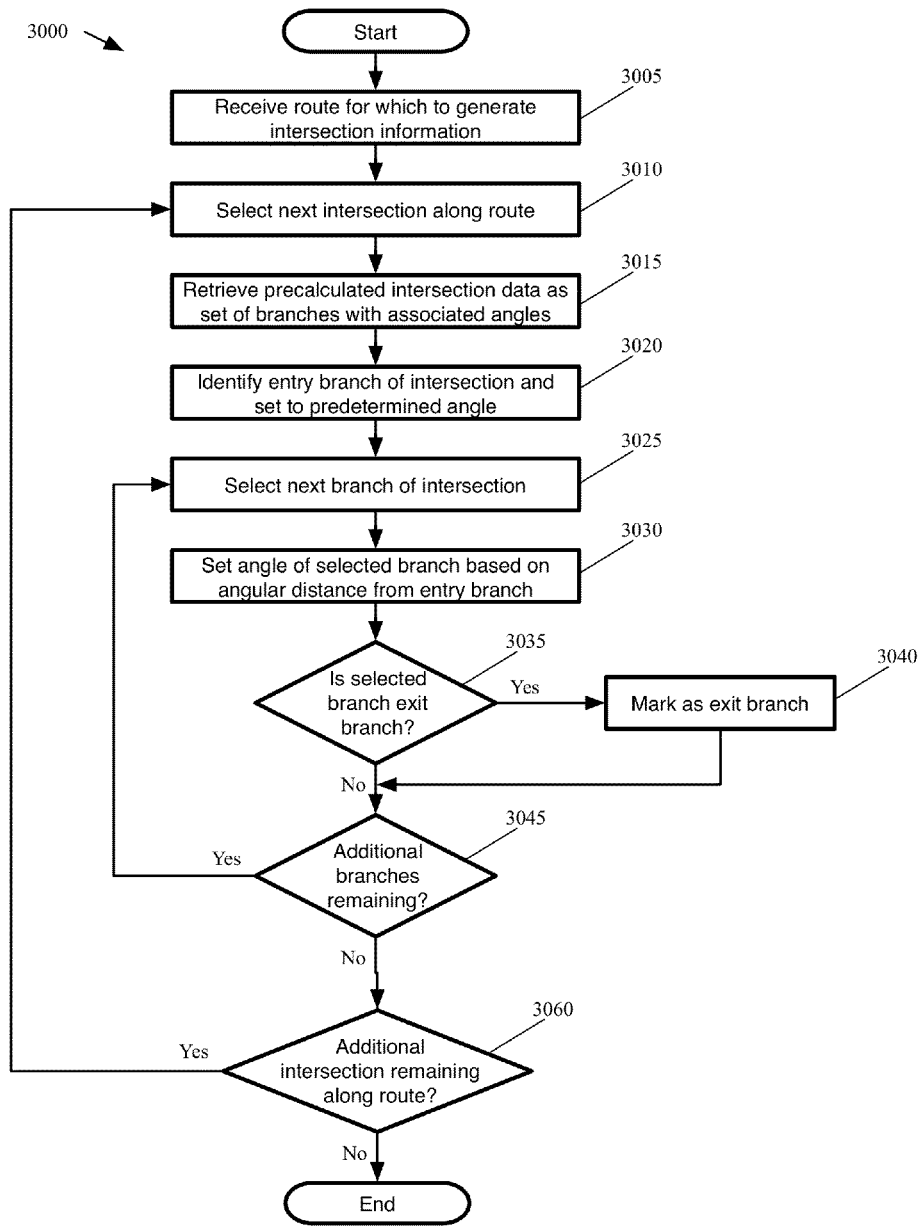
FIG. 30 conceptually illustrates a process of some embodiments for modifying intersection data in order to provide navigation information for a route.

FIG. 30 conceptually illustrates a process 3000 of some embodiments for modifying intersection data in order to provide navigation information for a route. As shown, the process begins by receiving (at 3005) a route for which to generate intersection information. As mentioned above, some embodiments generate one or more routes for each set of starting and ending locations requested by a user device. Each of these routes consists of a series of maneuvers at various path intersections (i.e., at road intersections).

As shown, with the route identified, the process 3000 selects (at 3010) the next intersection along the route. Some embodiments begin with the first intersection (i.e., the first maneuver a user following the route will make), starting from the start point of the route. Many routes involve long stretches along a particular road, going straight through numerous intersections (possibly including junctions of two road segments that are part of the same road and at which no other roads intersect). In some embodiments, the navigation instructions do not include information about the intersections at which no turning maneuver is made. Accordingly, the next intersection is actually the next intersection along the route at which a maneuver will be made.

The process then retrieves (at 3015) precalculated intersection data as a set of branches with associated angles. As described above, some embodiments store a data structure for each intersection, which lists the branches of the intersection along with angles for each branch. FIGS. 27 and 28 illustrate examples of such data structures, for both a point intersection and a roundabout intersection.

After retrieving the data structure for the selected intersection, the mapping service rotates the intersection definition to normalize the definition to the direction at which the route enters the intersection. Accordingly, the process 3000 identifies (at 3020) the entry branch of the intersection and sets the entry branch to a predetermined angle. Some embodiments set the direction of movement into the intersection as 0°, and therefore set the entry branch of the intersection to 180°.

The process then rotates the other branches of the intersection. As shown, the process selects (at 3025) a next branch of the intersection. In some embodiments, the branches and angles are stored in an array, list, or similar data structure, and the process traverses this data structure. The process sets (at 3030) the angle of the selected branch based on an angular distance from the entry branch. For example, if the entry branch was stored as 0° (i.e., pointing North), then a branch stored as 95° will be shifted 180° to −85°. In addition, the process determines (at 3035) whether the selected branch is the exit branch of the junction (i.e., the branch at which the route exits the intersection). In order for the turn-by-turn navigation instructions at the client mapping/navigation application to properly display the maneuvers, the device needs to know along which branch of the intersection the route exits. Thus, when the selected branch is the exit branch, the process 3000 marks (at 3040) the selected branch as such. The process then determines (at 3045) whether any additional branches of the intersection remain to be converted for the route. When additional branches remain, the process returns to 3025 to select the next branch of the junction. When all branches have been processed for the current intersection, the process 3000 determines (at 3060) whether additional intersections remain along the route that need to be modified. When additional intersections remain, the process returns to 3010 to select the next intersection. When the last intersection is modified, the process ends.

Figure 31:
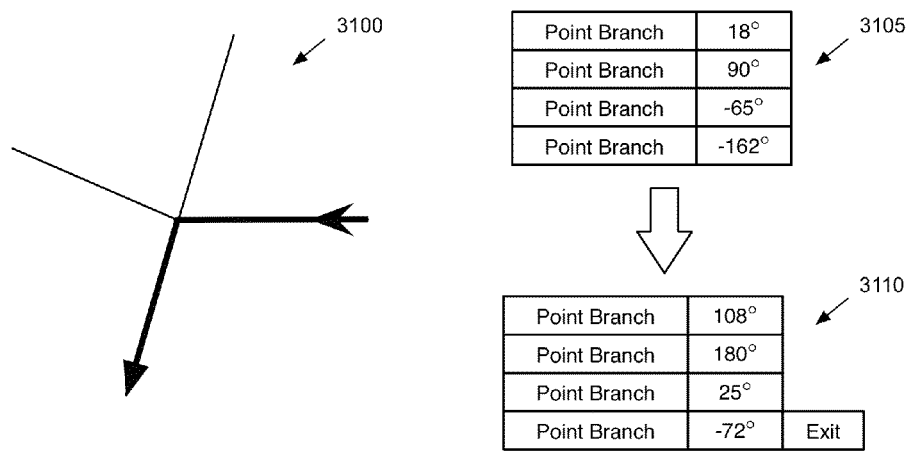
FIG. 31 illustrates a conceptual drawing of a route taken through an intersection, a data structure for the intersection, and the modification of the data structure to create a new data structure for turn-by-turn navigation instructions.

FIG. 31 illustrates a conceptual drawing of a route taken through an intersection 3100, a data structure 3105 for the intersection, and the modification of the data structure to create a new data structure 3110 for turn-by-turn navigation instructions. As shown, the route enters from the right side (the 90° branch) and exits the intersection at the bottom (the −162° branch). In the modified data structure, the entry branch has been rotated to 180°, causing a 90° rotation of the other branches. The branch at 18° rotates to 108°, the branch at −65° rotates to 25°, and the branch at −162° rotates to −72°. In addition to the rotation angles, the data structure 3110 has the last branch marked as the exit for the navigation. Some embodiments include a binary exit field, with the exit branch marked with a '1' and all other branches marked with a '0'.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 32:
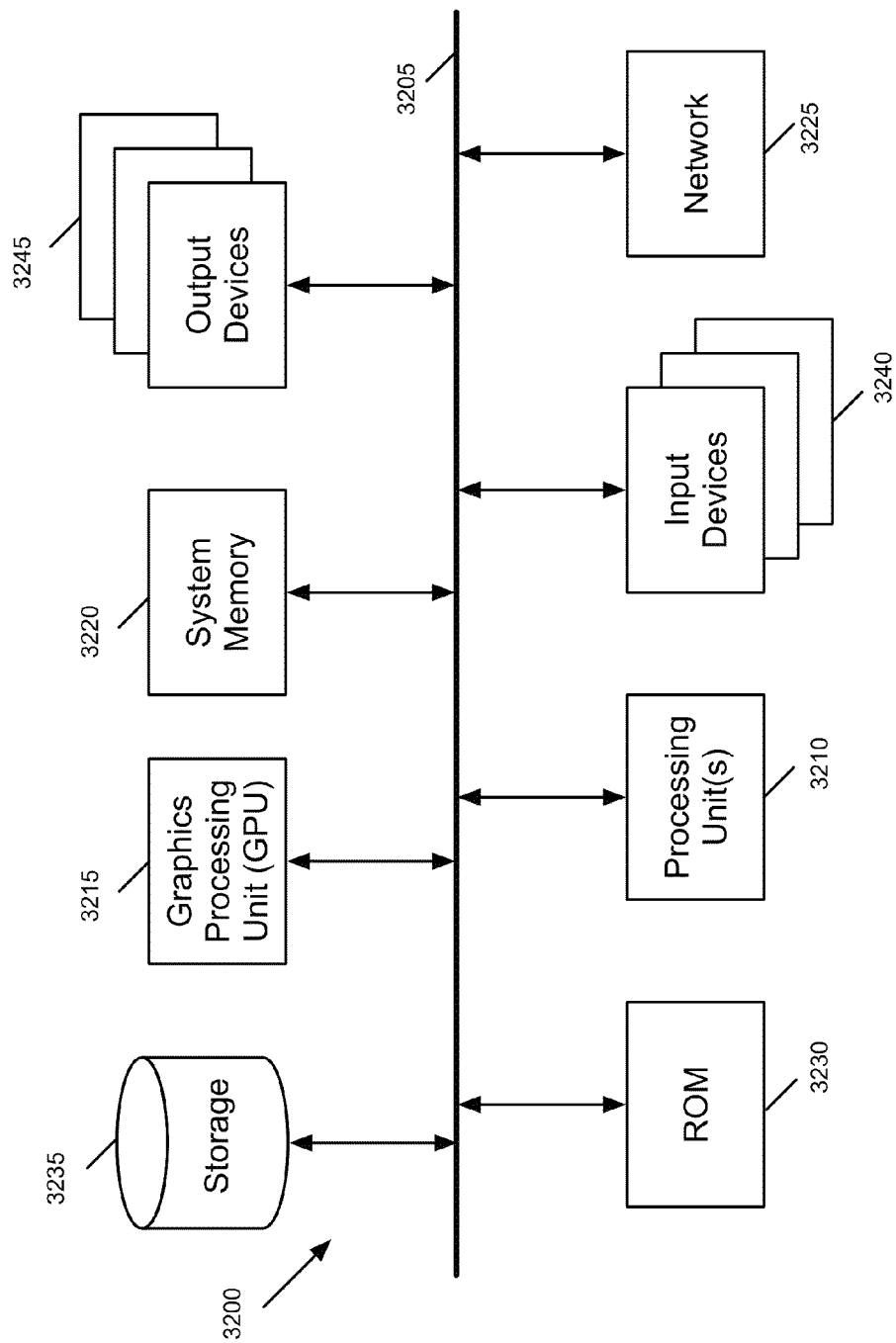
FIG. 32 conceptually illustrates an example of an electronic system with which some embodiments of the invention are implemented.

FIG. 32 conceptually illustrates an example of an electronic system 3200 with which some embodiments of the invention are implemented. The electronic system 3200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3200 includes a bus 3205, processing unit(s) 3210, a graphics processing unit (GPU) 3215, a system memory 3220, a network 3225, a read-only memory 3230, a permanent storage device 3235, input devices 3240, and output devices 3245.

The bus 3205 collectively represents all system, peripheral, and chip set buses that communicatively connect the numerous internal devices of the electronic system 3200. For instance, the bus 3205 communicatively connects the processing unit(s) 3210 with the read-only memory 3230, the GPU 3215, the system memory 3220, and the permanent storage device 3235.

From these various memory units, the processing unit(s) 3210 retrieves instructions to execute and data to process in order to execute the processes of the invention. The processing unit(s) may be a single processor or a multi-core processor in different embodiments. Some instructions are passed to and executed by the GPU 3215. The GPU 3215 can offload various computations or complement the image processing provided by the processing unit(s) 3210. In some embodiments, such functionality can be provided using CoreImage's kernel shading language.

The read-only-memory (ROM) 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive, integrated flash memory) as the permanent storage device 3235.

Other embodiments use a removable storage device (such as a floppy disk, flash memory device, etc., and its corresponding drive) as the permanent storage device Like the permanent storage device 3235, the system memory 3220 is a read-and-write memory device. However, unlike storage device 3235, the system memory 3220 is a volatile read-and-write memory, such a random access memory. The system memory 3220 stores some of the instructions and data that the processor needs at runtime. In some embodiments, the invention's processes are stored in the system memory 3220, the permanent storage device 3235, and/or the read-only memory 3230. From these various memory units, the processing unit(s) 3210 retrieves instructions to execute and data to process in order to execute the processes of some embodiments.

The bus 3205 also connects to the input and output devices 3240 and 3245. The input devices 3240 enable the user to communicate information and select commands to the electronic system. The input devices 3240 include alphanumeric keyboards and pointing devices (also called "cursor control devices"), cameras (e.g., webcams), microphones or similar devices for receiving voice commands, etc. The output devices 3245 display images generated by the electronic system or otherwise output data. The output devices 3245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), or an Intranet, or a network of networks, such as the Internet. Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

IV. Map Service Environment

Figure 33:
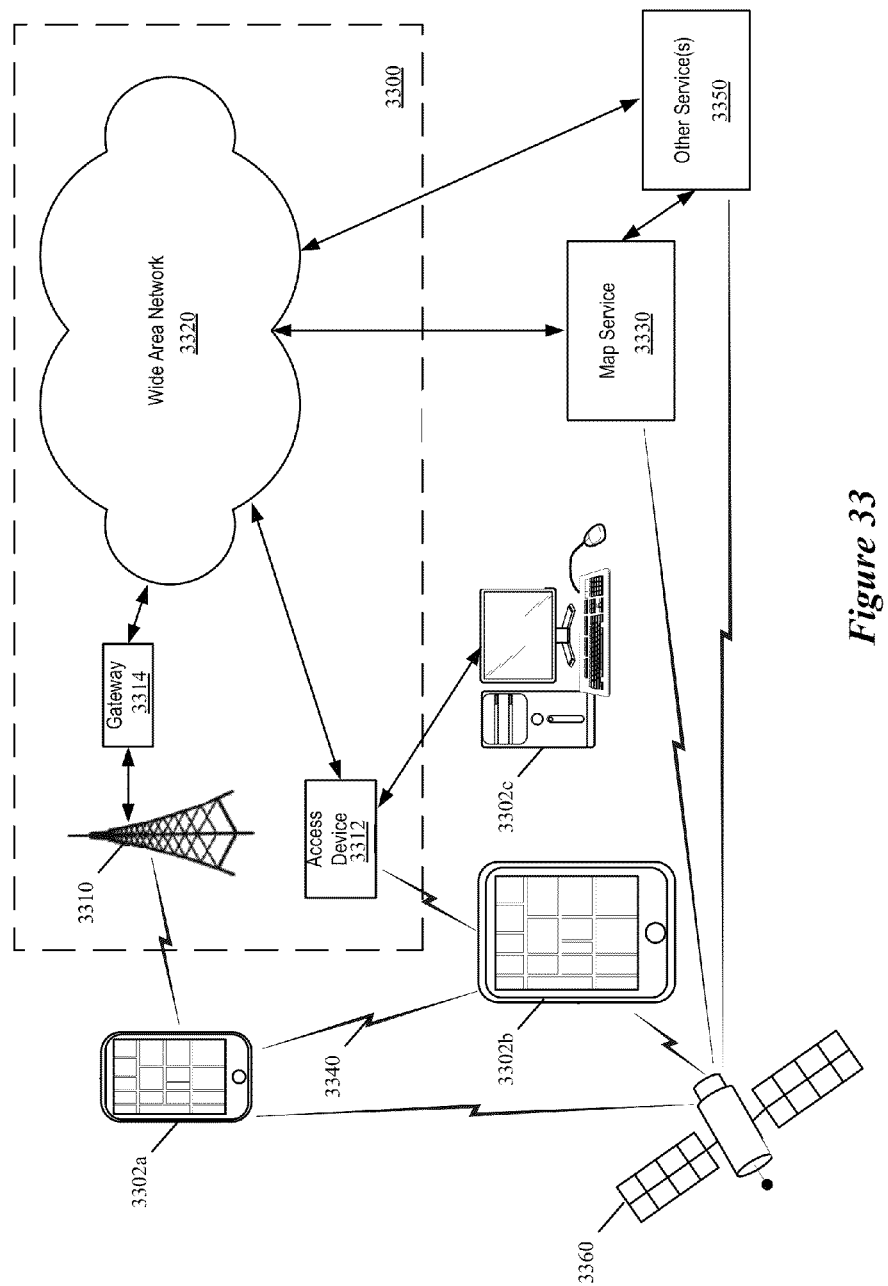
FIG. 33 illustrates a map service operating environment, according to some embodiments.

Various embodiments may operate within a map service operating environment. FIG. 33 illustrates a map service operating environment, according to some embodiments. A map service 3330 (also referred to as mapping service) may provide map services for one or more client devices 3302a-3302c in communication with the map service 3330 through various communication methods and protocols. A map service 3330 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 3302a-3302c may utilize these map services by obtaining map service data. Client devices 3302a-3302c may implement various techniques to process map service data. Client devices 3302a-3302c may then provide map services to various entities, including, but not limited to, users, internal software or hardware modules, and/or other systems or devices external to the client devices 3302a-3302c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 3302a-3302c) are implemented on different portable-multifunction device types. Client devices 3302a-3302c utilize map service 3330 through various communication methods and protocols. In some embodiments, client devices 3302a-3302c obtain map service data from map service 3330. Client devices 3302a-3302c request or receive map service data. Client devices 3302a-3302c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides realtime route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 33 illustrates one possible embodiment of an operating environment 3300 for a map service 3330 and client devices 3302a-3302c. In some embodiments, devices 3302a, 3302b, and 3302c communicate over one or more wire or wireless networks 3310. For example, wireless network 3310, such as a cellular network, can communicate with a wide area network (WAN) 3320, such as the Internet, by use of gateway 3314. A gateway 3314 in some embodiments provides a packet oriented mobile data service, such as General Packet Radio Service (GPRS), or other mobile data service allowing wireless networks to transmit data to other networks, such as wide area network 3320. Likewise, access device 3312 (e.g., IEEE 802.11g wireless access device) provides communication access to WAN 3320. Devices 3302a and 3302b can be any portable electronic or computing device capable of communicating with a map service. Device 3302c can be any non-portable electronic or computing device capable of communicating with a map service.

In some embodiments, both voice and data communications are established over wireless network 3310 and access device 3312. For instance, device 3302a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 3310, gateway 3314, and WAN 3320 (e.g., using Transmission Control Protocol/Internet Protocol (TCP/IP) or User Datagram Protocol (UDP)). Likewise, in some implementations, devices 3302b and 3302c can place and receive phone calls, send and receive e-mail messages, and retrieve electronic documents over access device 3312 and WAN 3320. In various embodiments, any of the illustrated client device may communicate with map service 3330 and/or other service(s) 3350 using a persistent connection established in accordance with one or more security protocols, such as the Secure Sockets Layer (SSL) protocol or the Transport Layer Security (TLS) protocol.

Devices 3302a and 3302b can also establish communications by other means. For example, wireless device 3302a can communicate with other wireless devices (e.g., other devices 3302b, cell phones, etc.) over the wireless network 3310. Likewise devices 3302a and 3302b can establish peer-to-peer communications 3340 (e.g., a personal area network) by use of one or more communication subsystems, such as Bluetooth® communication from Bluetooth Special Interest Group, Inc. of Kirkland, Wash. Device 3302c can also establish peer to peer communications with devices 3302a or 3302b (not shown). Other communication protocols and topologies can also be implemented. Devices 3302a and 3302b may also receive Global Positioning Satellite (GPS) signals from GPS satellites 3360.

Devices 3302a, 3302b, and 3302c can communicate with map service 3330 over the one or more wire and/or wireless networks, 3310 or 3312. For instance, map service 3330 can provide a map service data to rendering devices 3302a, 3302b, and 3302c. Map service 3330 may also communicate with other services 3350 to obtain data to implement map services. Map service 3330 and other services 3350 may also receive GPS signals from GPS satellites 3360.

In various embodiments, map service 3330 and/or other service(s) 3350 are configured to process search requests from any of client devices. Search requests may include but are not limited to queries for business, address, residential locations, points of interest, or some combination thereof. Map service 3330 and/or other service(s) 3350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 3330 and/or other service(s) 3350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 3330 and/or other service(s) 3350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 3330 and/or other service(s) 3350 provide one or more feedback mechanisms to receive feedback from client devices 3302a-3302c. For instance, client devices may provide feedback on search results to map service 3330 and/or other service(s) 3350 (e.g., feedback specifying ratings, reviews, temporary or permanent business closures, errors etc.); this feedback may be used to update information about points of interest in order to provide more accurate or more up-to-date search results in the future. In some embodiments, map service 3330 and/or other service(s) 3350 may provide testing information to the client device (e.g., an A/B test) to determine which search results are best. For instance, at random intervals, the client device may receive and present two search results to a user and allow the user to indicate the best result. The client device may report the test results to map service 3330 and/or other service(s) 3350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, pinch gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 6, 15, 16, 19, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A machine readable medium storing a program which when executed by at least one processing unit generates intersection data for paths in a map region, the program comprising sets of instructions for:
   receiving a set of junctions in a map region, each of a plurality of the junctions comprising at least two received paths that intersect with each other in the map region at the junction;
   for a particular junction of at least two intersecting paths, automatically determining whether any of the other junctions in the map region satisfy criteria to be part of a single intersection with the particular junction; and
   when at least one of the other junctions satisfies the criteria, automatically combining the other junctions that satisfy the criteria with the particular junction into a single intersection for use in performing mapping operations, the single intersection replacing multiple received junctions in a definition of the map region used for performing the mapping operations.

2. The machine readable medium of claim 1, wherein the mapping operations comprise generating a route in response to a user request.

3. The machine readable medium of claim 1, wherein the particular junction comprises a first dual carriageway path intersecting a second dual carriageway path.

4. The machine readable medium of claim 3, wherein the other junctions that satisfy the criteria comprise (i) a junction between the first dual carriageway path and a third dual carriageway path that corresponds to the second dual carriageway path, (ii) a junction between the second dual carriageway path and a fourth dual carriageway path that corresponds to the first dual carriageway path, and (iii) a junction between the third dual carriageway path and the fourth dual carriageway path.

5. The machine readable medium of claim 4, wherein the criteria for all four junctions to be part of the single intersection comprises the first dual carriageway path and the fourth dual carriageway path being within a threshold distance of each other and a threshold angular range of each other.

6. The machine readable medium of claim 5, wherein the threshold distance and the threshold angular range are greater when the first dual carriageway path and the fourth dual carriageway path have at least one name in common.

7. The machine readable medium of claim 5, wherein the criteria for all four junctions to be part of the single intersection further comprises the second dual carriageway path and the third dual carriageway path being within the threshold distance of each other and the threshold angular range of each other.

8. A method for generating intersection data for paths in a map region, the method comprising:

for a map region, identifying a first junction of road segments, at least one of the road segments tagged with data indicating that the tagged road segment is part of a dual carriageway;

determining whether a second junction of road segments, at least one of which is tagged with data indicating that the road segment is also part of a dual carriageway, satisfies criteria to be part of a single intersection with the first identified junction; and when the second junction satisfies the criteria, automatically combining the first and second junctions into a single defined intersection.

9. The method of claim 8, wherein a first road segment that is part of the first junction and a second road segment that is part of the second junction are tagged as single direction paths of dual carriageways, wherein the determination comprises determining that the first road segment and second road segment are corresponding single direction paths in opposite directions of the same dual carriageway.

10. The method of claim 9, wherein a third road segment is a connector road that intersects with the first road segment at the first junction and the second road segment at the second junction, wherein the first and second junction are combined into a single U-turn intersection.

11. The method of claim 8, wherein the defined intersection is stored in a mapping service data storage for use in generating navigation instructions in response to user requests.

12. A method for generating intersection data for paths in a map region, the method comprising:

receiving a set of junctions in a map region, each of a plurality of the junctions comprising at least two received paths that intersect with each other in the map region at the junction;

for a particular junction of at least two intersecting paths, automatically determining whether any of the other junctions in the map region satisfy criteria to be part of a single intersection with the particular junction; and when at least one of the other junctions satisfies the criteria, automatically combining the other junctions that satisfy the criteria with the particular junction into a single intersection for use in performing mapping operations, the single intersection replacing multiple received junctions in a definition of the map region used for performing the mapping operations.

13. The method of claim 12, wherein the mapping operations comprise generating a route in response to a user request.

14. The method of claim 12, wherein the particular junction comprises a first dual carriageway path intersecting a second dual carriageway path.

15. The method of claim 14, wherein the other junctions that satisfy the criteria comprise (i) a junction between the first dual carriageway path and a third dual carriageway path that corresponds to the second dual carriageway path, (ii) a junction between the second dual carriageway path and a fourth dual carriageway path that corresponds to the first dual carriageway path, and (iii) a junction between the third dual carriageway path and the fourth dual carriageway path.

16. The method of claim 15, wherein the criteria for all four junctions to be part of the single intersection comprises the first dual carriageway path and the fourth dual carriageway path being within a threshold distance of each other and a threshold angular range of each other.

17. The method of claim 16, wherein the threshold distance and the threshold angular range are greater when the first dual carriageway path and the fourth dual carriageway path have at least one name in common.

18. The method of claim 16, wherein the criteria for all four junctions to be part of the single intersection further comprises the second dual carriageway path and the third dual carriageway path being within the threshold distance of each other and the threshold angular range of each other.

19. A computer readable medium storing a program which when executed by at least one processing unit generates intersection data for paths in a map region, the program comprising sets of instruction for:

for a map region, identifying a first junction of road segments, at least one of the road segments tagged with data indicating that the tagged road segment is part of a dual carriageway;

determining whether a second junction of road segments, at least one of which is tagged with data indicating that the road segment is also part of a dual carriageway, satisfies criteria to be part of a single intersection with the first identified junction; and when the second junction satisfies the criteria, automatically combining the first and second junctions into a single defined intersection.

20. The computer readable medium of claim 19, wherein a first road segment that is part of the first junction and a second road segment that is part of the second junction are tagged as single direction paths of dual carriageways, wherein the set of instructions determining comprises a set of instructions determining that the first road segment and second road segment are corresponding single direction paths in opposite directions of the same dual carriageway.

21. The computer readable medium of claim 20, wherein a third road segment is a connector road that intersects with the first road segment at the first junction and the second road segment at the second junction, wherein the first and second junction are combined into a single U-turn intersection.

22. The computer readable medium of claim 19, wherein the defined intersection is stored in a mapping service data storage for use in generating navigation instructions in response to user requests.

* * * * *